United States Patent
Murray

(10) Patent No.: US 9,618,714 B2
(45) Date of Patent: Apr. 11, 2017

(54) OPTICAL WIRING SYSTEMS AND METHODS

(71) Applicant: David W. Murray, New Hope, AL (US)

(72) Inventor: David W. Murray, New Hope, AL (US)

(*) Notice: Subject to any disclaimer, the term of this patent is extended or adjusted under 35 U.S.C. 154(b) by 0 days.

(21) Appl. No.: 14/880,213

(22) Filed: Oct. 10, 2015

(65) Prior Publication Data

US 2016/0105021 A1     Apr. 14, 2016

Related U.S. Application Data

(60) Provisional application No. 62/063,813, filed on Oct. 14, 2014.

(51) Int. Cl.
| | |
|---|---|
| *G02B 6/38* | (2006.01) |
| *G02B 6/42* | (2006.01) |
| *H01R 24/30* | (2011.01) |
| *H01R 24/78* | (2011.01) |

(52) U.S. Cl.
CPC ......... *G02B 6/4278* (2013.01); *G02B 6/3882* (2013.01); *H01R 24/30* (2013.01); *H01R 24/78* (2013.01)

(58) Field of Classification Search
None
See application file for complete search history.

(56) References Cited

U.S. PATENT DOCUMENTS

| | | | |
|---|---|---|---|
| 4,767,181 A | 8/1988 | McEowen | 350/96.21 |
| 5,345,520 A | 9/1994 | Grile | 385/15 |
| 5,696,861 A | 12/1997 | Schimmeyer | |
| 5,967,840 A | 10/1999 | Rose et al. | 439/577 |
| 6,533,466 B1 | 3/2003 | Smith | 385/75 |
| 6,855,881 B2 | 2/2005 | Khoshnood | 174/15.1 |
| 7,959,362 B2 | 6/2011 | Sommer | |
| 8,170,722 B1 | 5/2012 | Elberbaum | |
| 8,175,463 B2 | 5/2012 | Elberbaum | 398/141 |

(Continued)

FOREIGN PATENT DOCUMENTS

EP     1045266 A2     10/2000

OTHER PUBLICATIONS

US International Searching Authority, "International Search Report and Written Opinion of the international searching authority", mailed Jan. 12, 2016 for PCT/US 15/55045.

(Continued)

*Primary Examiner* — Sung Pak
(74) *Attorney, Agent, or Firm* — James Richards

(57) ABSTRACT

An architected system of distribution of power and information using copper wire for power distribution and fiber optic for communication of information. The architected system is comprehensive for connections and upgrades related to the function, installation, terminations at every junction of a 3 wire plus light system. The archetected system enables each powered device in a smart home, smart office, or smart industrial installation with respect to a permanent and adaptable framework for an network foundation and structure. The architected system may include: wire, connectors, housings, devices, extension cords, appliance termination points, central processing, central power distribution, and a software methods for reliable data distribution.

1 Claim, 32 Drawing Sheets

(56) References Cited

U.S. PATENT DOCUMENTS

| | | | | |
|---|---|---|---|---|
| 8,331,794 | B2 | 12/2012 | Elberbaum | 398/141 |
| 8,331,795 | B2 | 12/2012 | Elberbaum | 398/141 |
| 8,442,792 | B1 * | 5/2013 | Elberbaum | G06F 19/00 |
| | | | | 702/107 |
| 8,531,310 | B2 * | 9/2013 | Cutler | H01H 9/181 |
| | | | | 200/293 |
| 8,638,087 | B2 * | 1/2014 | Elberbaum | G01R 19/00 |
| | | | | 324/110 |
| 9,175,815 | B2 * | 11/2015 | Padro | F21V 33/006 |
| 9,253,908 | B2 * | 2/2016 | Shinoda | H05K 7/00 |
| 9,257,251 | B2 * | 2/2016 | Elberbaum | H01H 51/27 |
| 9,281,147 | B2 * | 3/2016 | Elberbaum | H01H 51/27 |
| 2003/0167631 | A1 | 9/2003 | Hallenbeck | 29/835 |
| 2004/0000816 | A1 | 1/2004 | Khoshnood | 307/149 |
| 2004/0218873 | A1 | 11/2004 | Nagashima et al. | 385/75 |
| 2010/0278537 | A1 | 11/2010 | Elberbaum | 398/112 |
| 2012/0183298 | A1 | 7/2012 | Elberbaum | 398/112 |
| 2012/0207481 | A1 | 8/2012 | Elberbaum | 398/113 |
| 2012/0262006 | A1 | 10/2012 | Elberbaum | |
| 2013/0163192 | A1 | 6/2013 | Ballantine et al. | |

OTHER PUBLICATIONS

Applicant, PCT/US 15/55045 Applicant Response to the Written Opinion of the International Searching Authority mailed Jan. 12, 2016; response filed with Demand.

US International Searching Authority, "Written Opinion of the International Preliminary Examining Authority", mailed Oct. 4, 2016 for PCT/US 15/55045.

* cited by examiner

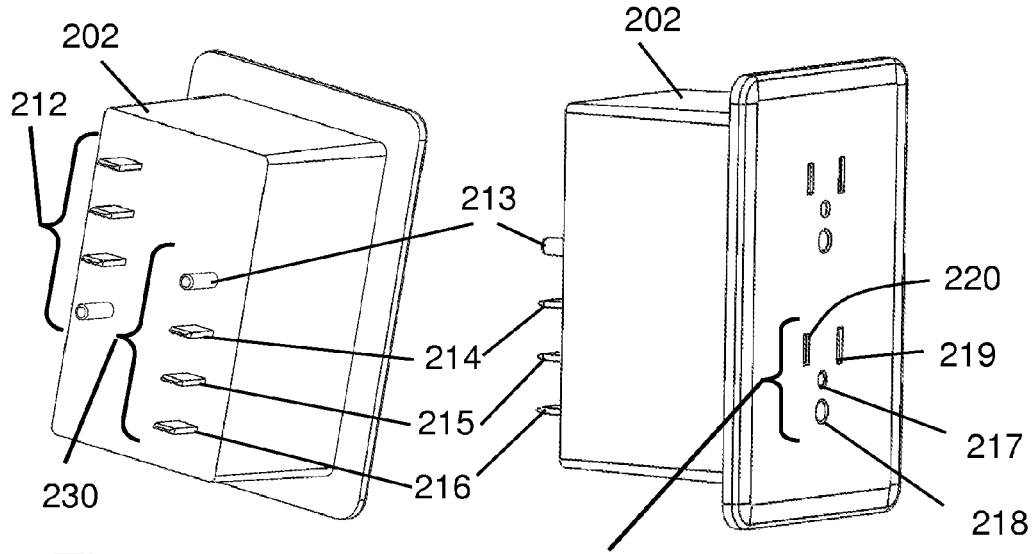
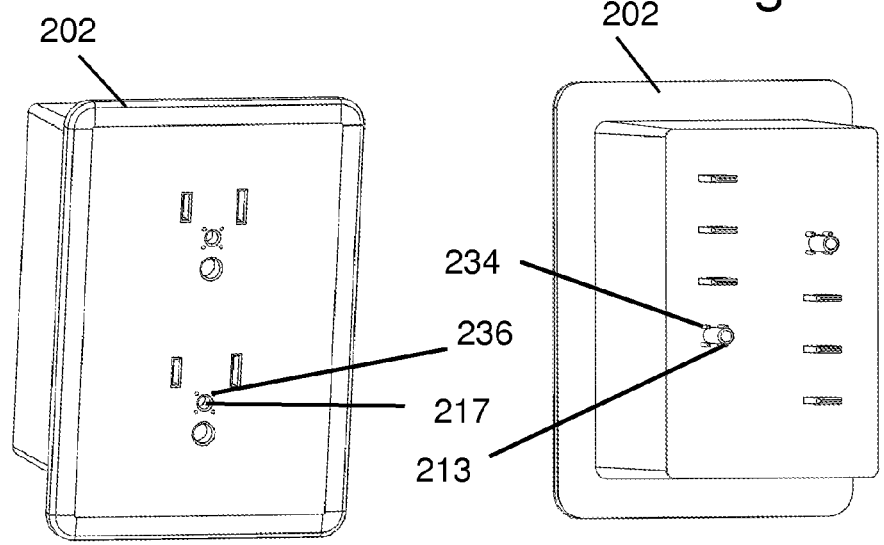
Fig. 2a  Fig. 2b
Fig. 2c  Fig. 2d

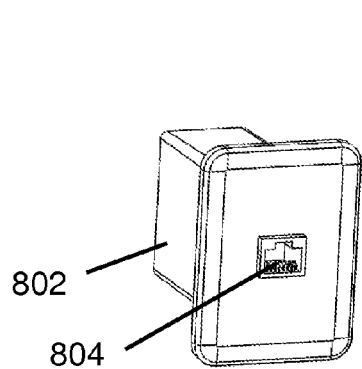
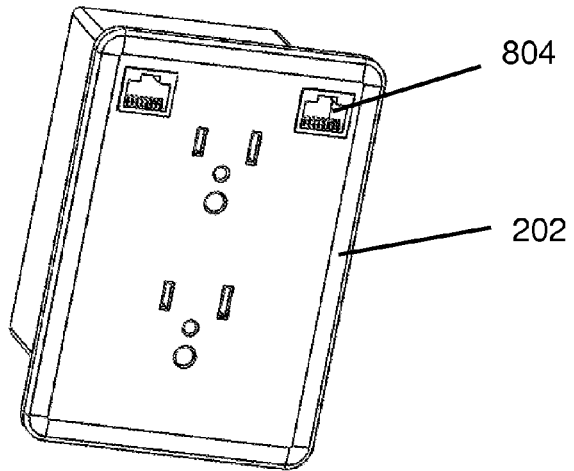
Fig. 9a    Fig. 9b
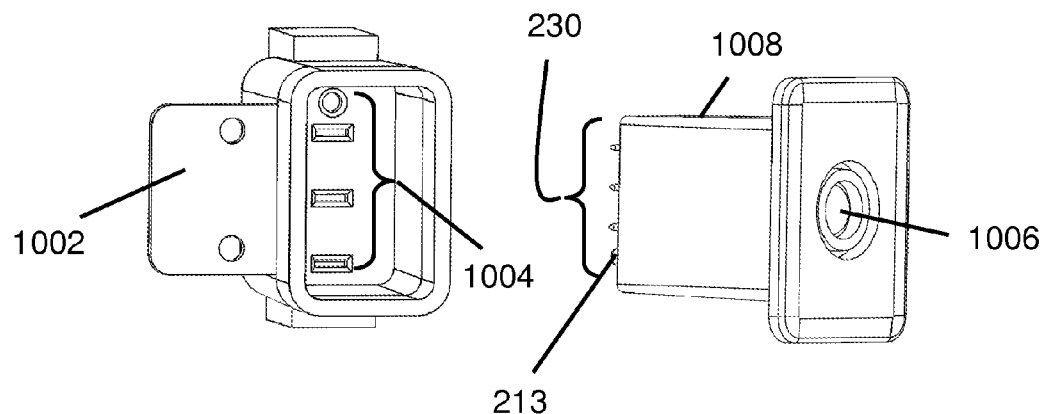
Fig. 10a    Fig. 10b

OPTICAL WIRING SYSTEMS AND METHODS

RELATED APPLICATIONS

This application claims the benefit under 35 USC 119(e) of provisional application Ser. No. 62/063,813, titled "Optical Wiring Systems and Methods", filed Oct. 14, 2014 by Murray, which is hereby incorporated herein by reference in its entirety.

BACKGROUND

Technical Field

The present invention pertains generally to the field of optical wiring systems and data distribution networks, more particularly to optical network wiring and connectors in combination with power wiring.

Background

AC and DC powered devices are controlled by interrupting the flow of electricity. For many decades the interruption was manually decided per the action of a person who had a desire to alter function. Many forms of automation have been added over the years to decrease the actions required to achieve a repetitive sequence when certain events occur. A simple switch added to a door allows for light when opened. A motion sensor added to turn on light when a person enters a room. Automation takes many forms and has evolved to allow configurable systems that permit the choices to vary by simply programming new outcomes when certain conditions apply.

Expanded control takes a few different forms. Two notable ones are (1) by use of homerun wiring schemes and (2) communication using radios. A home run system requires a lot of upfront planning. To enable home run control, systems have been devised to centralize decision making to a single electronic device. This necessitates that wires are connected from all points of control to return to the central electronic decision maker for outcomes. This is effective, but does require a lot of wire and is cumbersome and expensive to change. Many systems installed in homes require 20 to 30 miles of wire. Changing a system or adding new items is very difficult to do. Programming for homerun wired systems is awkward and clumsy. Radio types of control have been tried for many years. Advances allow for addressable radios that will identify and separate devices from one another so that inadvertent communication is minimized. The problem with that is that as the number increases, the polling time goes up and responses diminish. It may be easy to add in new items but the system slows down with each addition. When enough radios are present, the system can be made unusable.

The current state of a resource control system is a randomly executed group of smart devices that communicate using radios at different frequencies and different data protocols. Many use wireless hubs from the internet or communicate device to device. Often times they require batteries and redundant hardware to manage communication data The data does not have a current standard by which to perform, so much of the efforts are completely incompatible. Likewise, the same function is duplicated unnecessarily. For instance, a time function must be present on all devices instead of a central location. This results in low cost and lower performing timing functions due to cost.

Conventional wiring methods also have many drawbacks. Although fixtures, plugs, ceiling fans, light switches, and other permanently wired devices are replaced, the wire making the connection almost is never replaced. There are homes that still use porcelain wiring spools that are over 100 years old. Wiring is simply never replaced until it poses an immediate health or fire risk. When fixtures are replaced, there is sometimes a shorting of the wires or damage in the replacement process. Badly accomplished replacement leads to fire and shock hazards. The difficulties mean that homeowners often have to call upon an electrician to replace or maintain systems that require more immediate attention. In the case of new homes, many times changes are requested for adding switches or altering the control prior to homes being sold. This usually results in very high costs and delays associated with the effort.

The most reliable method of the transfer of information at high rates of speeds is by use of an optical fiber. Light is essentially captured by the fiber and transmits signals from one location to another. Traditionally, this is used for communication between data sources such as computers, routers, modems, switches, telephony, and cable companies. It is reliable but expensive to connect due to its very high quality. A signal can in some cases be transferred miles apart without loss of integrity. It is also virtually resistant to all forms of piracy or vandalism. It does require great skill to install so that its quality is assured and maintained; therefore it is very costly unless it is the plastic variety. The plastic variety has a very short distance that it can transmit.

BRIEF DESCRIPTION

The present disclosure relates generally to an architected system of distribution of power and information using copper wire for power distribution and fiber optic for communication of information. The architected system is comprehensive for connections and upgrades related to the function, installation, terminations at each junction of a 3 wire plus light system. The archetected system enables every powered device in a smart home, smart office, or smart industrial installation with respect to a permanent and adaptable framework for a network foundation and structure. The architected system may include: wire, connectors, housings, devices, extension cords, appliance termination points, central processing, central power distribution, and a software methods for reliable data distribution.

The resource control system is a term used to describe a great number of devices that communicate information from device to device to achieve a given idea or task. The purposes are too many to describe or currently even be understood. In simple terms, the communication enables better and configurable control of devices to achieve many purposes defined and to be defined. This generally involves events that are monitored by sensors and communicated to a central point of computing to calculate and execute a desired outcome. The natures of resources—both human and inert—require automation to do more for the best possible outcomes. Energy management is desired but not at the expense of the humans to be served by it. Other resources such as water, time, and human effort are all too precious to waste.

Most of the efforts to date involve communication via radios which are typically powered by batteries. This requires human effort to maintain and is quite often unnecessary. Attempts in times past have also involved using discreet wire to form a bridge of communication to a central location for control purposes. This is an expensive waste of wire and must be constantly redone to achieve new results.

The simple elements of the task are: (1) Sense at the most ideal location to obtain the desired information; (2) Compile the information from all pertinent sources; (3) Devise and outcome needed; (4) Control the resource desired; and (5) Confirm the desired result.

The process is ever diligent to maintain the resources of energy (generated from fuels, solar gain, or simply purchased), water, time, and human efforts.

This disclosure involves a comprehensive system which enables communication and power by structuring plastic fiber optic cable along with electrical wires to form a back bone system that will infrequently change.

The system requires new installation and data boxes that would be used for connecting point to point throughout a serial chain of power originating at the circuit breaker and terminating at the farthest point of power and control. The structured system involves the following units. First, there are typically three conductive wires bundled with fiber optic communication. An exemplary SMART DEVICE PORT (SDP) of the present disclosure is shown in FIG. 2b and includes wire plus light. Second, there is an exemplary TERMINATION BOX (see FIG. 1a) that enables wiring, data, and terminations for the SMART DEVICE PORT. The SMART DEVICE PORT can take many forms including:

1. Wall outlet
2. Switch
3. Data Port/Input Display
4. Camera
5. Security device
6. Speaker mount/port
7. Vent control
8. Thermostat
9. Entry keypad
10. Light mount
11. Phone Jack
12. Smoke Detector*
13. Occupancy detector*
14. Temperature monitor*
15. Communication port
16. Microphone
17. Coax connection for TV
18. Wall outlet/USB port
19. Sprinkler Valve (Fire Prevention)
20. Fan mount
21. Door Bell*
22. Changeable Wall Sconce
23. Cabinet Lights
24. Motorized Shades/Blinds
25. HVAC control
26. Irrigation
27. Video Art

* Asterisk indicates that the item may be included in another device

The TERMINATION BOX can installed anywhere a typical electrical junction box can be used. SMART FUNCTIONS in accordance with an embodiment of the present disclosure can only be used if the SMART DEVICE PORT is installed. This disclosure also covers non-SMART DEVICE PORT inserts as well for use in situations where programmability is not immediately desired but may be in the future. Any device that works with the system is covered.

The TERMINATION BOX is an item considered to be a permanent installed feature of the system and is typically mounted to a wall or other suitable surface to make connections with electrical and optical wiring. There are no electronics in the TERMINATION BOX. However, in other embodiments of the present disclosure there may be electronics contained within the TERMINATION BOX. The TERMINATION BOX forms the permanent structural back bone for the adaptable components in the overall installation. All of these features of the system are the destination of the overall architecture.

Electronic components radically change every few years. The expected life of many components is less than 10 years regardless of their function. Making swift and easy changes is the advantage of a structured system. Many times upgrades are made because of performance rather than failure of function. Since the upgraded components will be replaced by simply removing a single screw, the system can be installed and upgraded infinitely. It is expected that the TERMINATION BOX will become the new standard for many devices in the far future.

The long term solution for destinations is the use of a 3 WIRE PLUS LIGHT PLUG (3 WPLP) and TERMINATION DEVICE in accordance with an embodiment of the present disclosure. The primary reason for a system, such as this, is to be able to communicate directly with devices. The 3 WPLP can enable data to be ported directly to the device without any other connections made. A computer can be connected to a monitor by simply plugging in both items, i.e., the electrical and optical. A printer can be connected across the room simply by plugging into power. Modern TV and phone systems are digitally based and can function the same way. An extension phone base with charger need only be plugged into the wall. A television will no longer require other connections for signal or speakers.

The system will store data indicative of important information and performance history for smart energy adaptations and targeted conveniences. A central timer will reach out for accurate time and send signals to the most accurate time. All smart devices will then have identical time based on the time corresponding to the central device. This central clock simplifies all the other devices and makes uniformity better. Shared sensors in all of the devices will also simplify the number required and add benefits for higher quantity sensing without extra expense. The system's central processing can also make complex associations without having to have expensive processing throughout.

During the interim time prior to full acceptance, provisions must be made to enable the use of existing devices. A number of hybrid devices will be made to enable flexibility with older devices. This would include a SDP with a universal serial bus (USB) connection for instance. This would enable that printer to be hooked up across the room until 3 WPLP can be integrated into devices. Other types of devices would include cable TV coaxial cable connector, speaker connections, and fire wire. It is important to not have the loss of a device added to the expense of installation.

The final destination piece is a termination circuit that will translate the light into electrical signals that will be used by the devices' smart circuitry to communicate. That will take the form of an integrated circuitry chip and printed circuit boards that will translate the light signal into appropriate information. The mechanical interfaces and data stream may be in accordance with the present disclosure. For instance the interface mechanical structure to an electromagnetic interference (EMI) filter or a power supply for a computer will have added on or built in interfaces to mate and communicate. It is expected that smart appliances will also have to integrate or add on circuits to enable communication.

The other end of the system is terminated in one of two ways: either a SMART HUB or a SMART CIRCUIT BREAKER DATA PORT. The SMART HUB is designed to provide an intermediate way to transition from conventional wiring to smart wiring. The SMART HUB is a stand-alone device made to connect various data entry devices such as telephone, Ethernet connections, cable TV, or it may be a radio frequency (RF) link to wireless devices. It is considered a limited one or two room HUB for limited remodeling provided all down-stream devices are wired using a TERMINATION BOX as described herein. It is constrained to be powered by a single circuit breaker link from main power.

The SMART CIRCUIT BREAKER DATA PORT is a long term solution for wiring an entire house, condominium, apartment, or office suite. It forms the central solution for power distribution, data entry, telephony, cable TV, and Internet. Power distribution for the SMART CIRCUIT BREAKER DATA PORT involves the use of various sources such as utility services, back-up generators, batteries, and solar generation sources. The overall device works as a circuit breaker box but has the added feature to control and regulate power in an organized fashion. It will also serve as power conditioning and whole house DC power distribution. Smart DC systems can be wired in a similar point to point method along with an appropriate circuit breaker in a similar fashion to AC wiring. The circuit should be separated from AC circuitry and is expected to have TERMINATION BOX identical to the AC version except for color coding. The expected DC smart device will employ entirely different and incompatible connections in order that the two versions are not confused.

It is expected that modern systems will be employed to allow utility systems to have external control over certain functions that require a good deal of power consumption. This is to aid in evening out the grid in a manner not requiring ever increasing enhancement that is expensive. To this end the SMART CIRCUIT BREAKER DATA PORT is more organized than the typical circuit breaker box. This enables outside sources some control over some systems during peak cycles. This usually means a lower cost for the owner and can be augmented by using a back-up system to supply the removed amount using solar, back-up generators, or batteries. If battery cost points decrease as expected, whole house back-up systems may become part of the future.

Additionally, the SMART CIRCUIT BREAKER DATA PORT (also referred to as SCBDP) also distributes data and signals for routing throughout the system. Since it is a data hub, a server type of computer can centrally store data on removable hard drives. The central computer is a pluggable device capable of being removed and upgraded from time to time. It is responsible for manipulating data as required for distribution and communication. It will have a dedicated operating system capable of resolving Boolean arguments that the user defines. Each smart destination will use these arguments to make necessary status changes deemed to function within the devices parameters. The simplified Boolean arguments will be made by linking various icon driven structures' sensor or status entries to form a plausible combined outcome.

The operating system for the resource control system provides an organized data stream. At a common clock timeframe data is either sent or received according to a common schedule. That schedule is organized in a fashion to systematically address each device in the system, and provide either data or status accordingly. The system also will provide, at a user's discretion, output to any appropriate device so that it is clear what the status of any new or changed item is. The user has full control and discretion over this. In addition, the system would provide the ability to use outside application software to control a particular resource.

It is strongly desired to save energy by eliminating systems' usage when not needed. A device working for entertainment while no one is there to be exposed is simply wasting energy. There are literally thousands of relationship failures such as this one that could be automatically eliminated or eliminated by choice if a system could understand how to decide. It requires the available information to be provided to a device capable of being able to execute the choices being made by the user. It is expected that this could and would be ever changing and being updated long term on a universal backbone system. Many of the relationships could be made automatically if the information exists for the user. For instance, no person is in a room for five minutes while the TV, lights, and audio system is playing. A typical device is plugged into the wall using power because there is no information to make any decisions. A smart device identifies itself as an amplifier and knows that automatically there is no one to listen because of sensors in the room. Everything works this way automatically. Then the user choices come into play. The timeframe is 5 minutes—the user decides one minute is enough. The system updates its' parameters. The second choice is to allow it to play because the person is in the next room and likes the background. The user adapts the system by allowing more occupancy detection than just the room source. All of these decisions can also be made with modifiers that allow the decision to only be made under certain conditions. For instance, play music if next room only if it is between certain hours of the day or if another adjacent room is unoccupied.

The system's ability will be limited only by the information available to it. The system's ability to be updated will only be limited by either end of the backbone. Since the SDP's will be capable of being updated by simply removing a single screwed in device and the SCBDP will be updated by plug in modules, all that is left is the backbone itself. That will be considered to a 50 year device. The current 3 wire system for wiring was mandated in the United States in 1974 and was widely used prior to being mandated. The cost and universality of the three wire system cannot be replaced any time soon. Any system will have to work in conjunction with that system. Otherwise the system would require too much financial loss to all of the devices and infrastructure currently in use. Eventually the advantages of the THREE PLUS LIGHT (TPL) system will replace all devices. The advantage to TPL is that it has every safety feature is all inclusive plus new safety systems are also available. Currently, plug in safety involve a third ground path to permit safety during times when the system has failed. For instance, a ground plug pin is made longer than the other conductors so that a more viable electrical path than misplaced fingers will carry the current. Although this is good to prevent death, it does not prevent a painful experience. The SDP can prevent electrical connection until the plug is fully seated. This is the advantage of using light to make a non-conductive path prior to making electrical connection. Since all connected parts are non-electrically conductive, there are no safety agency approval violations to contend with. The TPL only has to contend with electrical and light connectivity from location to location. The only limitation of the total current being used on the string of devices connected.

Like many systems, information as to use is not available. In a single room connected to a single circuit breaker many high-current using devices may be deployed simultaneously. The result of this is usually causing a circuit breaker to trip disconnecting the entire system. If the system is INTELLEGENT, it will know ahead of time what devices are deployed and understand prior to failure the priority to operation— either by default or choice. For instance, a toaster and a can opener require too much power for the circuit breaker. The system default would be to suspend the toaster for the least expected duration of operation—the can opener. Once the can opener was stopped, the toaster would resume. Detection of power consumption and use can also be deployed for safety. Disconnections of devices when the ground path is misused are the guiding function of (Ground Fault Circuit Interrupter) GFCI devices being currently deployed. All of these functions are expected to be included in (Smart Device Port) SDP's where appropriate and upgraded along with better technologies. As the transition occurs, mixtures of intelligent and non-intelligent devices will be used and the SDP's will control and monitor according to default and choice.

One disclosed variation is directed to a system for optical data and electrical power connection in a single equipment connector, said system comprising:
a first connection box comprising:
    means for permanent connection to building power and building optical fiber network; and
    a pluggable socket connector connected to said means for permanent connection to building power, said pluggable socket connector for delivering said building power and optical fiber network;
a smart device port comprising:
    a pluggable pin connection adapted for connecting to said pluggable socket connection of said connection box, said pluggable pin connection including connection for said power, neutral, and ground electrical power and connection for said optical fiber network, and
at least one equipment socket connected to said pluggable pin connection and providing:
three electrical socket connections for said power, neutral and ground; and
at least one optical fiber socket connection connected to said connection for optical fiber through a smart device fiber link for delivering optical fiber network signals,
said at least one optical fiber socket spaced from the three electrical socket connections and disposed among the three electrical socket connections.

As a result, 3 Wire Plus Light System installed into an application forms the simplest to use, simplest to maintain, and simplest to upgrade, and keep current of any similar group of devices available. This not only supports current wiring of today, but also supports the devices far into the future.

These and further benefits and features of the present invention are herein described in detail with reference to exemplary embodiments in accordance with the invention.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 2a and FIG. 2b show isometric views of an exemplary primary Smart Device Port providing electrical outlet functionality with integral optical data connection.

FIG. 2c and FIG. 2d illustrate an exemplary variation of FIG. 2a and FIG. 2b showing the use of multiple fiber optic connections.

FIG. 2e illustrates internal fiber connects for the connection device of FIG. 2a.

FIG. 3c illustrates an exemplary face view of the plug of FIG. 3a.

FIG. 4 is a schematic diagram of an exemplary variation of the Smart Device Port of FIG. 2a installed in the termination box of FIG. 1a.

FIG. 9a shows an isometric view of a Smart Device Ports configured as a stand alone phone jack with a single phone connector.

FIG. 9b shows an isometric view of a smart device port configured with two phone connectors.

FIG. 10a show isometric views of a another termination box that is modified and miniaturized and having a three plus light connection configured for single data uses.

FIG. 10b shows a camera for use with the termination box of FIG. 10a, also shown with a lens to capture video data.

DESCRIPTION

Glossary 3 wire plus light, 3 wire plus light plug, 3WPLP, 3 plus light, three wire plus light—refers to the combination of three power conductors for power, neutral and ground, together with one or more fiber optic strands (light conductors) for bi-directional data communication.

Smart device port, SDP—refers to a device that plugs into a termination box and receives three wire plus light connection from the termination box and provides a service. The service may include one or more of a smart outlet, a sensor, a display, a data connection, audio service, or other service.

Smart socket, smart outlet—refers to an electrical outlet usable anywhere, but typically used as a wall outlet in a building. The smart outlet includes three electrical conductors and one or more optical fiber data or signal connectors within the same plug in connection. The SDP that includes a smart outlet may also interface with the optical data connection to connect services, sensors, controls or other functions.

Overview

The present disclosure is described as an overall system capable of complete resource management of electricity, water, sun, light, sounds, information, and human efforts to control the same. It has three basic areas that are covered—a long term installed backbone of wires and fiber optic conductors that terminate at both a start and an end of each path that is expected to have a 50 year life expectancy. Additionally, the system comprises smart control devices that are also plugged into each termination end that are expected to be upgraded on a 7 to 10 year life cycle. Further the system comprises pass though devices that extend into various appliances for direct control of the device at the final destination point. The entire path is capable of transmitting power and information bidirectionally.

DETAIL DESCRIPTION

Figure 1A:
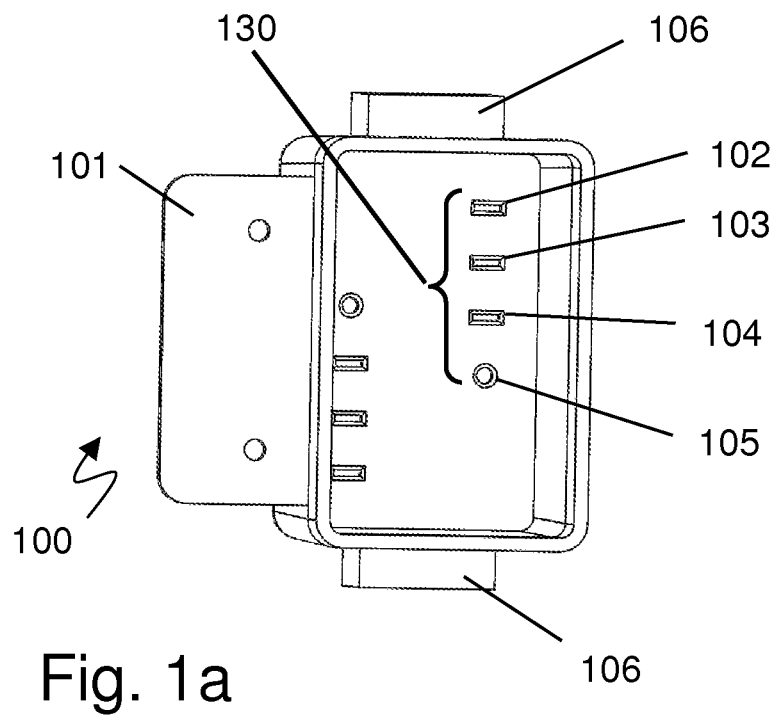
FIG. 1a and FIG. 1b show an isometric view of an exemplary termination box showing the basic box, the electrical connectors and the wiring junctions.

FIG. 1a illustrates an exemplary termination box for terminating house wiring and interfacing with smart outlets and other devices. FIG. 1a is an isometric view of a termination box 100 showing the basic box 101 with the three wire plus light connections comprising the electrical connectors 102, 103, and 104, and the fiber optic connection 105. The termination box also includes input wiring junctions 106 to connect to building power and optical network. Referring to FIG. 1a, the termination box 100 is part of the backbone of the system. The termination box 100 would be installed similarly to a typical junction box except that all wires and fiber optics are permanently affixed for what is expected to be a very long time. The termination box 100 typically has no active components inside and forms a connection platform for the smart device ports that are plugged into it, which are shown in various Figures in different variations. The power and data are passed from one end 106 to the other end and made available to a smart device port for data acquisition and control through electrical power connections 102, 103, and 104 and then data through port 105 via light transmission. A user may consider changing the smart data port from time to time to update or replace faulty or broken devices. In one embodiment, there are no active controls inside of a termination box—it is merely a pass through for power and data transmission. As such, configuration of the termination box 100 may be larger or smaller and be capable of adding a great many devices or just one in other variations. It is expected to also be color coded and reconfigured to serve as either a direct current connection or an alternating current connection. The alternating current and direct current are preferably incompatible with each other for safety considerations.

Figure 1B:
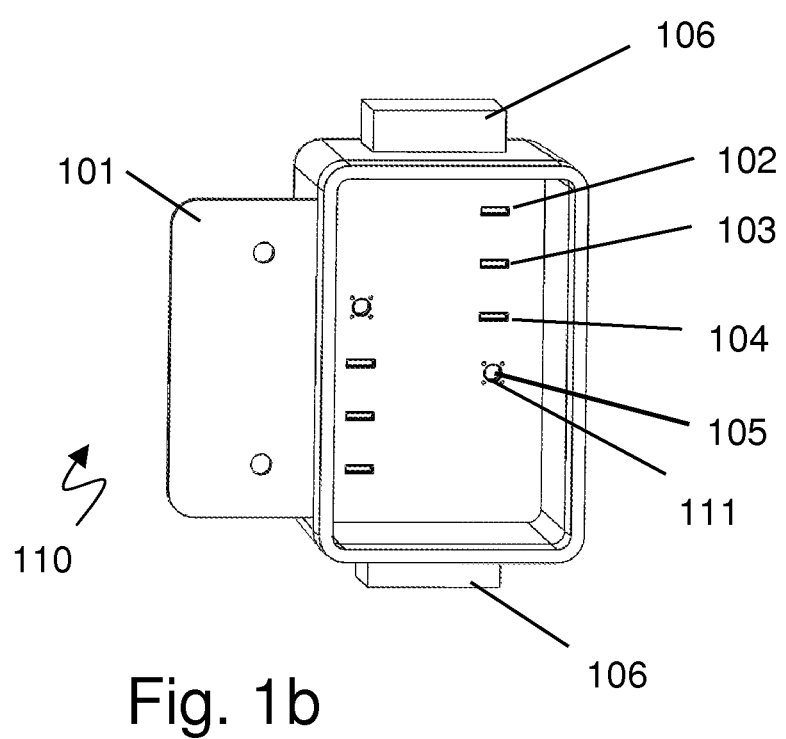

FIG. 1b illustrates an exemplary variation of FIG. 1a using multiple optical fiber connections. Referring to FIG. 1b, alternative termination box 110 shows additional fiber connections 111 around the location of the first fiber connection 105 of FIG. 1a. FIG. 1b shows the electrical connections 102, 103 and 104 in the same locations as FIG. 1a and a central fiber connection 105 in the same location as FIG. 1a, but with four additional smaller fiber connections 111 grouped around the original fiber connection. Any number of additional fiber connections may be used. In one variation, the original fiber link 105 may be an optical plastic fiber link and the added connections 111 may be glass fiber. Glass and plastic may be selected for either connection, depending on performance needed.

FIG. 2a and FIG. 2b show isometric views of an exemplary Smart Device Port 202 providing electrical wall outlet functionality with integral optical data connection. Smart Device Port 202, also referred to as outlet 202, may be plugged into termination box 101 to receive electrical power and optical signals. Power is input into this device using the three power input pins 214, 215, and 216 and data is received though connection 213 via light transmission. Reference 230 refers to the assembly including 213, 214, 215, and 216. The outlet 202 may or may not have a second circuit 212 for data transmission and is configured for providing power to plug-in devices via connections 218, 219, and 220 and data via connection 217 using light transmission. Reference 232 refers to the assembly including 217, 218, 219, and 220.

Connections 218, 219, and 220 preferably meet the dimensions for an industry standard, for example NEMA 5-15R, or NEMA 5-20R, NEMA 5-30R for home electrical outlets, NEMA 5-15P, NEMA 5-20P, and NEMA 5-30P for corresponding plugs. Other NEMA standards may be adapted by including an optical pin centered in the electrical pin pattern. Typical NEMA 5 devices are three-wire grounding devices (hot-neutral-ground) rated for 125 V maximum, with the 5-15, 5-20 and 5-30 being grounded versions of the 1-15, 1-20 and 1-30, respectively. The addition is a $3/16$-in (inch) (4.763 mm (millimeters)) diameter round or U-shaped ground pin, $1/8$ in (3.175 mm) longer than the power blades (so the device is grounded before the power is connected) and located below them by $1/4$ in (6.35 mm) edge-to-edge or $15/32$ in (11.91 mm) center-to-center. Typical plugs also comprise two blades (pins), hot and neutral, $1/16$ inch thick, $1/4$ inch wide $5/8$ inch long, spaced $1/2$ inch center to center. The neutral blade may be wider than $1/4$ inch.

When the plug is oriented with the ground pin down, the optical pin is preferably spaced from the ground pin and centered laterally above the ground pin and vertically positioned between the ground pin and a lateral line through the center of the hot and neutral blades, preferably centered between the ground pin and the near edge of the power blades, i.e., one eighth of an inch above the ground pin. Alternatively, the optical pin may be equidistant from the center of the three power pins. In a further alternative, the optical pin may be positioned at a center of mass position derived by averaging the horizontal coordinates and averaging the vertical coordinates of the center of each of the electrical pins to determine the horizontal and vertical coordinates of the optical pin or cluster of optical pins.

One advantage of the center position for the optical signals is that the center position may be the most stable and accurate position in the plug pin constellation because errors and displacements for each of the other pins "average" together to influence the center position, thus stabilizing the center position. The center fiber position is also protected by the metal electrical connection pins surrounding the center fiber pin, protecting from potential bumps and scrapes of a vulnerable unplugged plug (see FIG. 3a, FIG. 3b). See FIG. 3c for further discussion of a center or near center position for the optical plug and socket.

In various versions, the smart device port 202 may be a passive device with straight through connections. Alternatively the smart device port 202 may be capable of also turning off and on power to the power connections 218, 219, and 220 using a switch device such as a relay or electronic type switch that may be activated by optical signals.

The smart device port 202 may be held in the interface box by various features including but not limited to snap-in, clips, screws or other fasteners.

FIG. 2c and FIG. 2d illustrate an exemplary variation of FIG. 2a and FIG. 2b showing the use of multiple fiber optic connections. Four fiber optic connections 234 and 236, are added to the back 234 and front 236 of the smart device port 202 in the manner described for FIG. 1b, sockets for the outlet and pins for the plug. By adding connections and retaining the first connection, the system may retain compatibility with the first devices having only one fiber optic, e.g. a plug designed for use with FIG. 2b could be plugged into the socket of FIG. 2c retaining function of the center optical fiber 217.

Figure 2E:
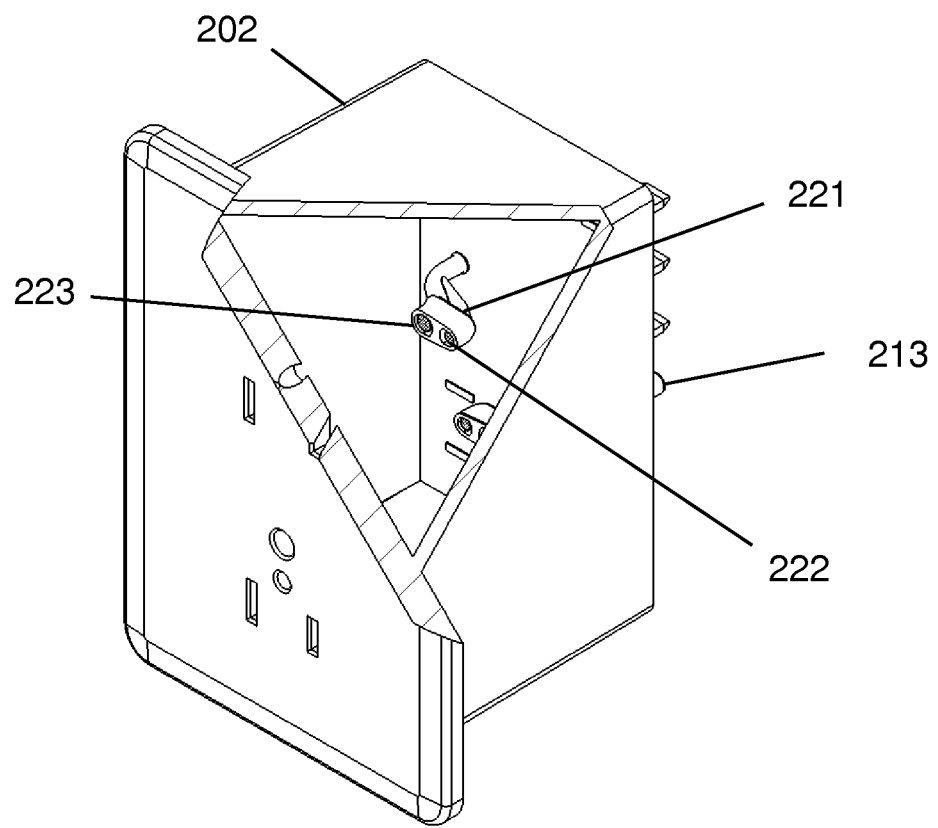

FIG. 2e illustrates internal fiber connects for the connection device of FIG. 2a. Fiber optic connects are an important feature of the resource management system. There are two primary methods by which data is transported throughout the system. They both have light tight features that prevent either light from inadvertently entering into the system or leaking out to other systems. This is accomplished by light pipes that join with the fiber optic to route and clamp the fiber optic into place. From there, butt joints made with other light pipes are made to join from device to device. The butt joint may also include a data splitter that allows for information to be transmitted as well as received. The inputs of these devices are typically a butt joint. The input 213 is split into 223 and 222 and sealed to the printed circuit card via an elastomeric boot 221. This allows for a signal that enters and exits a smart module 202 that is capable of relaying the signal in and out while maintaining data quality and extending the useful length of transmission. The output of this splitter 223 is made to receive the information and the input 222 is made to transmit data.

In one variation, the system includes control to connected appliances, for example, but not limited to toasters blenders, radios, televisions, refrigerators, computers, lights, and other devices. The power and data should connect into and out of these devices and be able to communicate with them. to the system may also be operated using non-smart conventional appliances and devices using standard plugs without fiber optic connection. This is why the form of power transmission 218, 219, and 220 are the same as expected and can accept a normal appliance plug. As acceptance and transition to a complete smart system occurs, appliances will adopt the method and provide data to pass in and out of their devices and communicate with the entire system. This may be done through a smart plug shown in FIG. 3a.

Figure 3A:
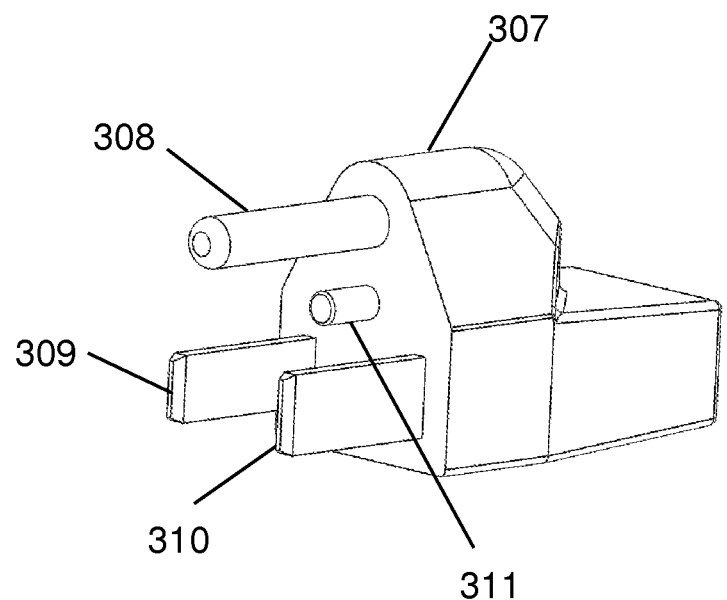
FIG. 3a and FIG. 3b illustrate exemplary smart plugs having electrical and optical connections for interfacing with the outlet of FIG. 2a and FIG. 2c respectively.

FIG. 3a illustrates an exemplary smart plug having electrical and optical connections for interfacing with the outlet of FIG. 2a. The plug 307 provides electrical power through 308, 309, and 310 using pins dimensioned to be compatible with conventional outlets. Plug 307 has an additional optical pin 311 compatible with the outlet 232 of FIG. 2b, socket 218. Devices that use a detachable type cord may use the cord shown in FIG. 29 that enables data connections using plug 307 at one end and connector 2904 at the other end. A connection similar to the one shown in FIG. 29 may be the only connection a computer would need to connect to the internet, connect to a printer, connect to a monitor, become a video phone, or connect to another networked device.

In one variation, the optical pin length of the plug pin 311 may be 0.25 inches long. The plug pin 311 may taper slightly to provide an increasing interference as the plug is inserted that enables a light tight connection.

Figure 3B:
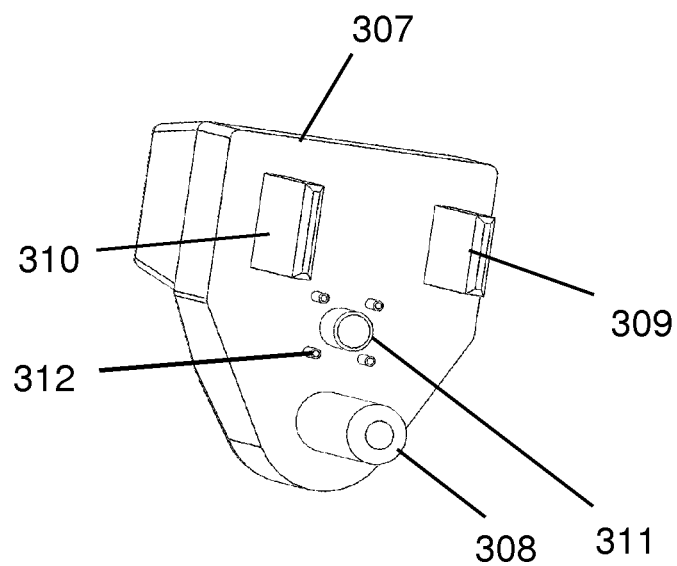

FIG. 3b illustrates an exemplary alternative to the plug of FIG. 3a with additional optical fiber connections. Referring to FIG. 3b, plug 307 is modified to include four additional fiber optic connections 312. The plug of FIG. 3b may be used with the socket of FIG. 2c. In one variation, the center optical connection may be optical plastic and the outer optical connections may be glass fiber optic. Glass and plastic may be used for either connection as desired for a given application.

Figure 3C:
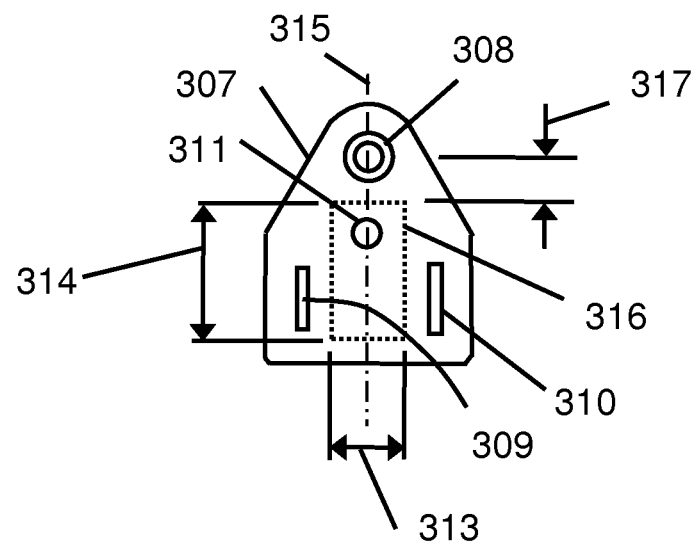

FIG. 3c illustrates an exemplary face view of the plug of FIG. 3a. Referring to FIG. 3c, the plug 307 is shown with the ground pin 308, neutral pin 310, power pin 309 and optical pin 311. The optical pin is preferably in a region laterally between the power and ground pins and below the ground pin, with the face of the plug oriented with the ground pin up. A socket would be constructed to mate with the plug.

A further preferred region is shown for disposition of the optical pin or pins. The region is shown centered between the power 309 and neutral 310 pins indicated by center line 315 and having a width 313 of preferably 0.300 inch (7.5 mm). The height 314 is preferably 0.58 inch (14.7 mm). The top edge as shown is a distance 317, preferably 0.200 inch (5.1 mm) from the center of the ground pin 308.

Figure 4:
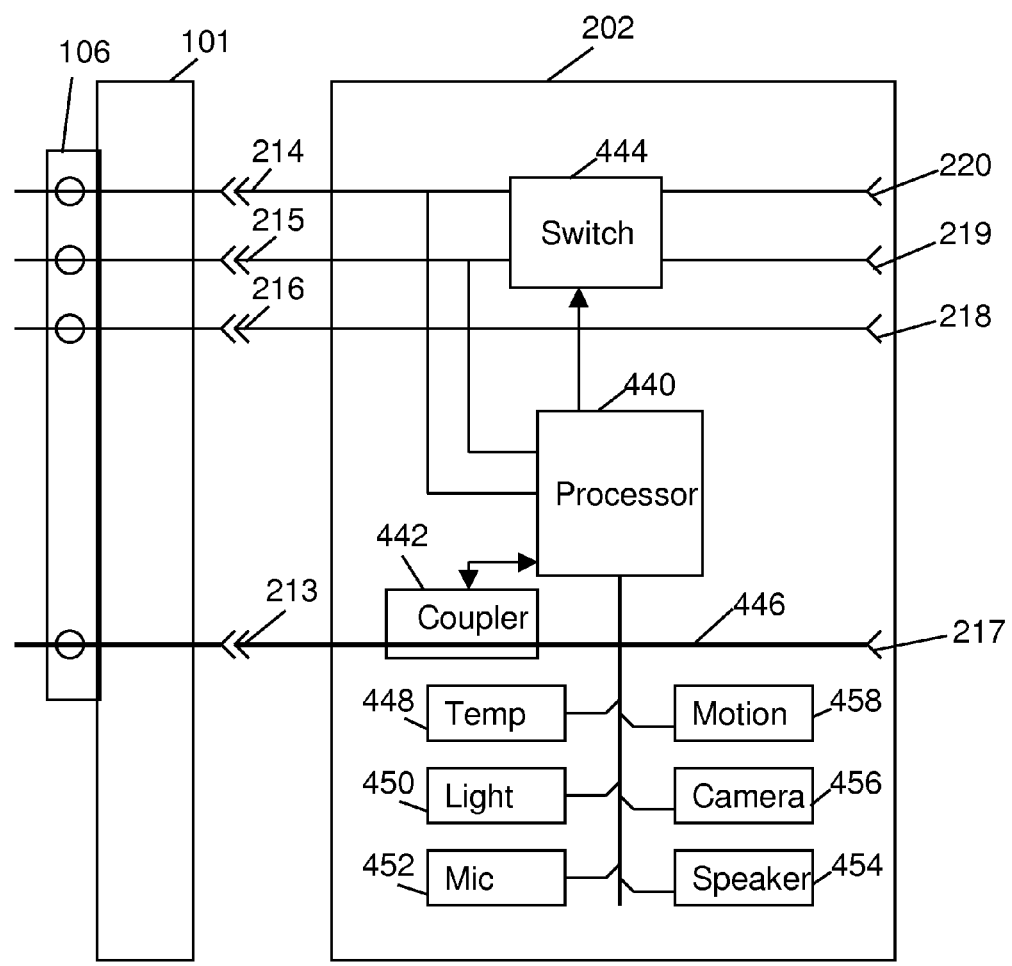

FIG. 4 is a schematic diagram of an exemplary variation of the Smart Device Port of FIG. 2a installed in the termination box of FIG. 1a. Referring to FIG. 4, the smart device port 202 is installed in the termination box 101. The termination box may be installed in a home, for example in the wall of a home in the manner of a typical electrical outlet. The termination box provides for permanent connection 106 to house wiring and house optical fiber. The output side of the termination box provides plug in connection to the smart device port for convenient replaceability and upgradability of the smart device port.

The smart device port receives power and optical signal from the termination box. The schematic of the smart device port of FIG. 4 includes numerous optional features potentially available. A basic smart device box may provide only straight through connections of power and fiber to the plug. In the variation shown, the smart device port includes a processor 440 coupled to the optical fiber 446 through an optical coupler 442 for sending and receiving control and information signals. The processor may control a switch 444 to turn off and on the power to the plug. Thus, a home information network may control the switch 444 from any networked device. Further, the processor software may be modified or upgraded through the optical fiber interface.

The smart device port may also include other optional sensors as desired. For example, a temperature sensor 448 may be included to monitor the temperature of the room. A light sensor 450 may be included to monitor the ambient light in the room. A microphone 452 may be included to monitor sound levels, receive voice commands, or other uses for sound. The smart device may include a speaker 454 to provide alerts, feedback, or other sounds. Further, the smart device may include a camera 456 or motion sensor 458 for security and other functions. Numerous other sensors and functions may be included as desired or needed for a particular application.

Several smart device port variations are considered to be the end of the system in that the fiber does not further connect and continue to another device. The end devices typically perform tasks such as data entry, system commands, voice input, camera input, and myriad of different types of switches.

Figure 5:
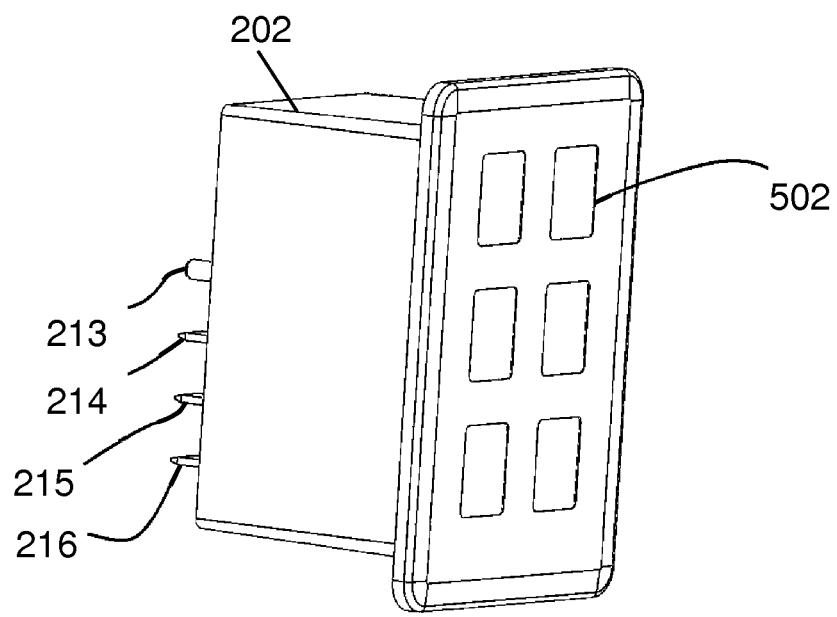
FIG. 5 shows an exemplary smart device port configured as an array of switches.

FIG. 5 shows an exemplary smart device port configured as an array of switches. Referring to FIG. 5, six different user input switches 502 are shown, each capable of being programmed for separate results. The switches may, for example, control lights, curtains, garage doors, security systems, or any other functions. The switches may be lighted. The switches are connected to an interface chip internal to the smart device port that senses the switch states and communicates the switch states through the optical fiber network to a controller, or directly to a controlled device. The smart device port receives power from connections 214, 215, and 216 and data from optical connection 213. The switch is low powered and only outputs data to the system to control power where needed.

Figure 6:
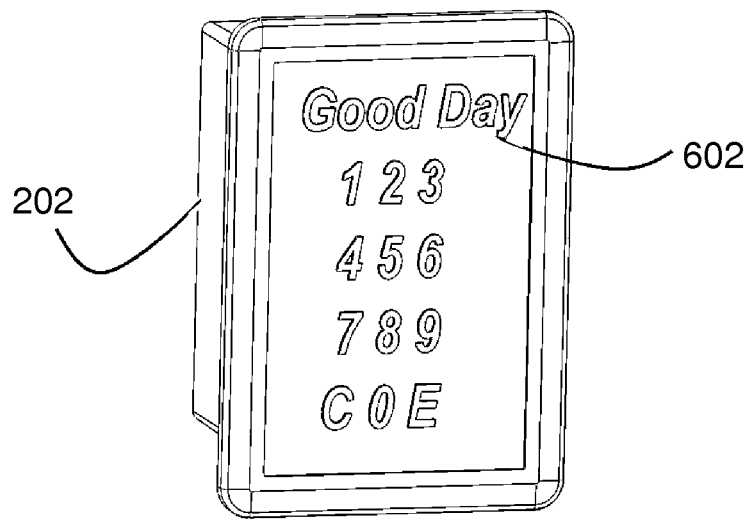
FIG. 6 is an isometric view of another variation of a Smart Device Port configured as a data port capable of being used by many different devices by use of a changeable touch screen and various GUI displayed touch areas.

FIG. 6 illustrates an exemplary smart device port 202 adapted to a touch screen display capable of having its screen to be configured and allow different types of menus to be presented. The smart device port of FIG. 6 plugs into a termination box 101 and allows different inputs per the user via the touch screen 602. This makes the device a Data Port and could allow user programmability for the system.

Any menu item could enable the device to be a switch, security keypad, timer, or a multitude of configurable items.

Figure 7A:
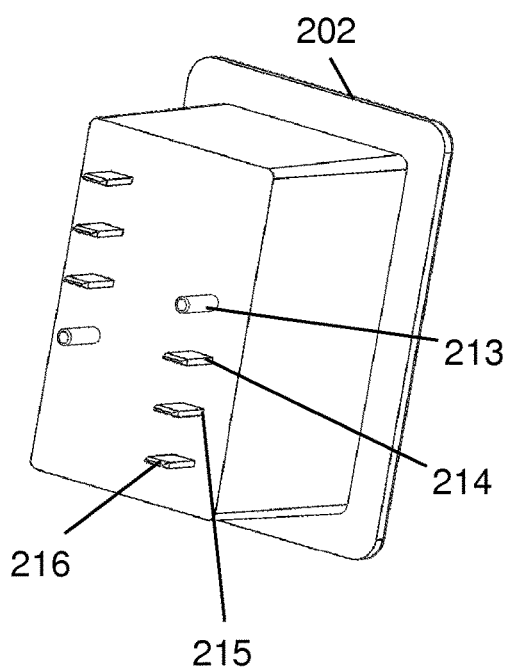
FIG. 7a and FIG. 7b show exemplary isometric views of the primary Smart Device Port showing the connections to the termination box as shown in FIG. 1a, the USB connections, and the connections to three wire plus light devices.
Figure 7B:
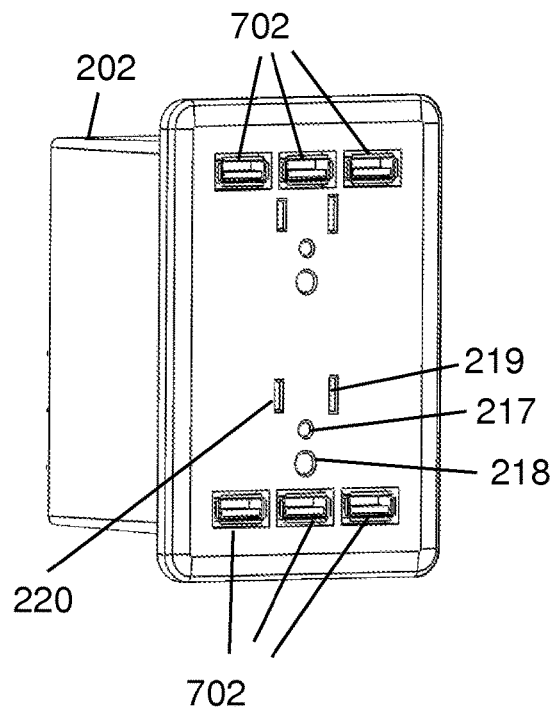

FIG. 7a and FIG. 7b show exemplary isometric views of the primary Smart Device Port showing the connections to the termination box as shown in FIG. 1, the USB connections, and finally the connections to optical networked devices.

It may be that the new smart device port may become a new standard for home wiring. During the adoption period there may be several transition years. There are a number of legacy devices that exist that may be provided for in the transition years. FIG. 7a is a smart device port 202 adapted for just that purpose. FIG. 7b device has the same connectivity to the termination box 100 with input power being supplied via 214-216 and data being supplied with pin 213. The future expected connection supply power via 218, 219, 220 as well as data is supplied with data optic 217. But, in this case, accommodations to the past are made using, for example, USB type port 702 for legacy devices.

Figure 8:
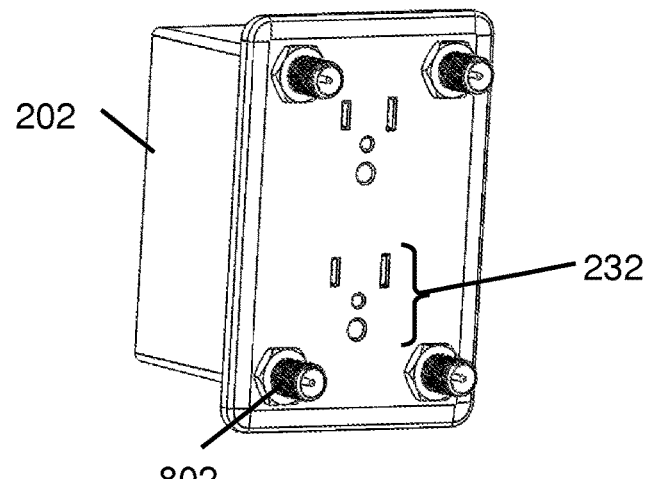
FIG. 8 shows an isometric view of another Smart Device Port configured as smart outlet that has standard smart outlet ports and cable TV connections via coax connectors.

Other exemplary legacy devices may also be supported such as is the coax connection shown in FIG. 8 or the phone connection shown in FIG. 9.

FIG. 8 illustrates an exemplary smart device port 202 with three wire plus light outlet 232, further including one or more coax connections 802. Internally, the fiber is coupled to a modem that converts fiber signals to conventional CATV or other RF or video or multimedia signals connected using, for example, coax connectors 802.

FIG. 9a and FIG. 9b illustrate exemplary miniature version smart device port 802 and regular smart device port 202 that support legacy phone jack 804. Internally, the smart devices 202 and 802 include an optical fiber modem to convert the telephone signals and couple to the fiber data signals.

FIG. 10a show a smaller version termination box 1002 and a standard power/data connection 1004.

FIG. 10b shows a smaller version smart device port for use with the termination box of FIG. 10a. The smaller version smart device port 1008 is shown adapted for a camera with a lens to capture video data The smaller device port 1008 is designed to allow the mating connection 230 including optical data connection 213 and providing the video feed to devices on the optical data network Smaller termination boxes can be used in places where more discreet smaller devices are desired.

Figures 11A, 11B:
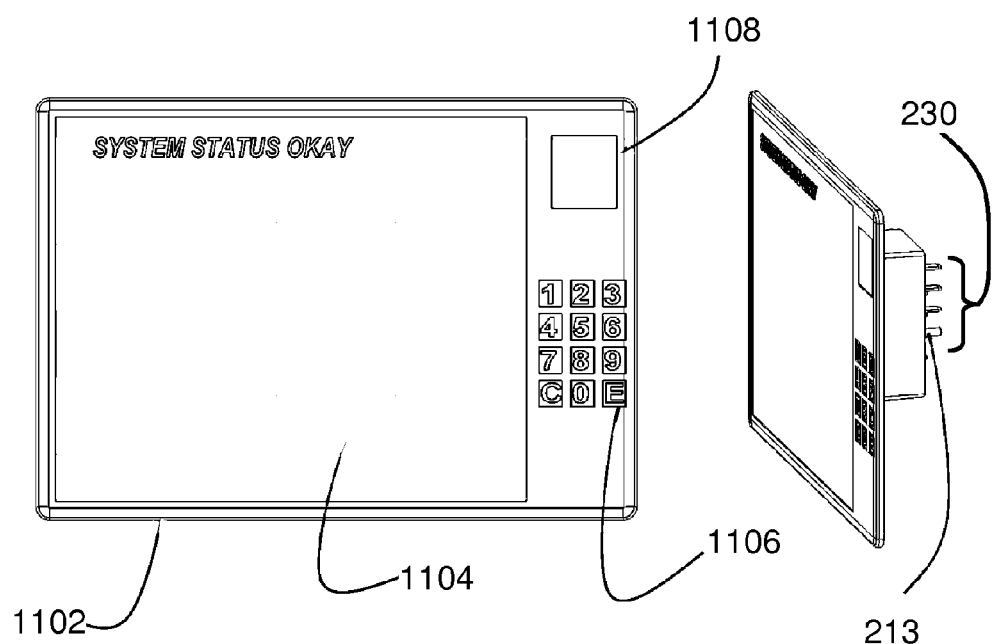
FIG. 11a and FIG. 11b show isometric views of an exemplary embodiment of a Smart Device Port configured as an indoor security screen that has a large display, a keyboard, a fingerprint scanner and plugs into a standard termination box (FIG. 1a) and connects to power and data via a three wire plus light connection as described herein.

FIG. 11a and FIG. 11b show isometric views of an exemplary embodiment of a Smart Device Port configured as an indoor security screen that has a large display, a keyboard, a fingerprint scanner and plugs into a standard termination box (FIG. 1a) and connects to power and data via a three wire plus light connection as described herein.

FIG. 11a shows a device 1102 that is quite large enabling very large display 1104 to show outside guests or simply offer larger display of nested menu structures for control or configuration. The smart device port does not have to be similar in size to the termination box it is attached to. The device may or may not have a keypad entry 1106 for passwords or other functions and may also have a fingerprint scanner 1108 that would limit data entry to as few as one person. Like other three plus light devices, the power and data may be enabled by the standard connection set 230 including optical connection 213.

Figure 12:
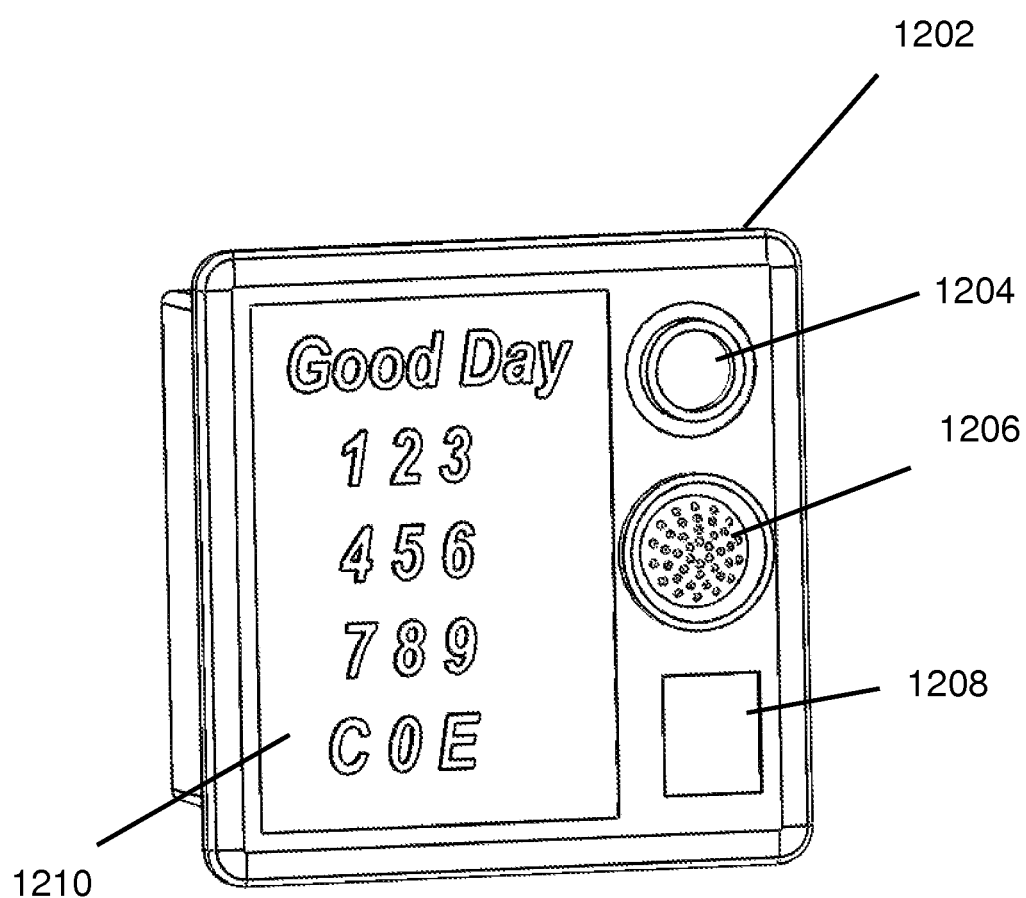
FIG. 12 shows an isometric view of an exemplary Smart Device Port configured as an outdoor security appliance that has facial recognition, voice recognition sensor, fingerprint recognition sensor, and keyboard entry.

FIG. 12 shows an isometric view of an exemplary Smart Device Port configured as an outdoor security appliance that has facial recognition, voice recognition sensor, fingerprint recognition sensor, and keyboard entry.

FIG. 12 illustrates a security device 1202 with a smaller screen 1210 than the screen of FIG. 11a that also has ability for nested menu structures. The security device 1202 includes a fingerprint identification device 1208, but adds a microphone 1206 for voice entry and a camera 1204 for video entry. The voice and video may be used for many different purposes. Voice and video both could identify a potential user for heightened security reasons. They can be configured as a dual access point to allow a fingerprint and voice to open the door. Voice and video both could act as a conduit and be placed anywhere appropriate for guest arrival and identification.

Figure 13:
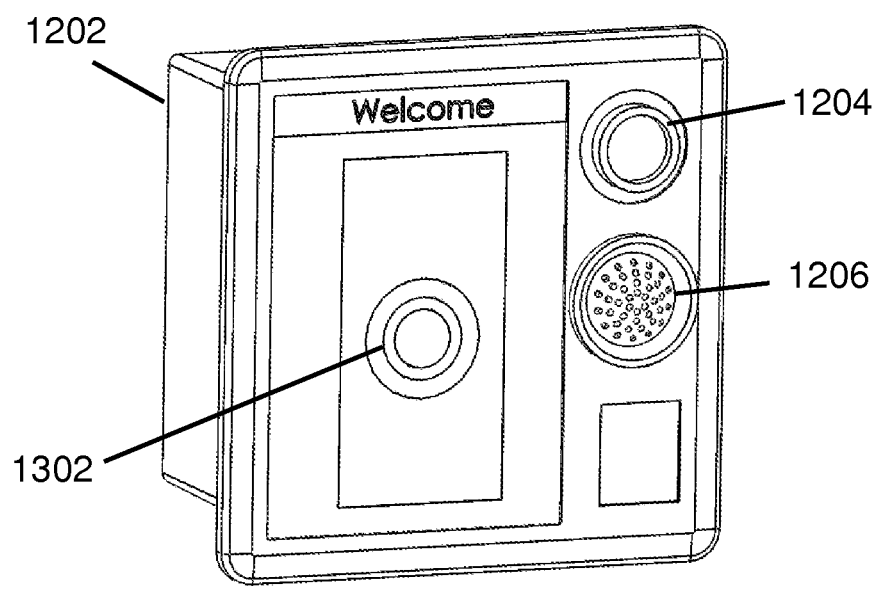
FIG. 13 is an isometric view of an exemplary Smart Device Port configured as a doorbell that has an identification camera, a microphone, and touch screen doorbell button.

FIG. 13 shows another smart port configured as a security device 1202 which may be same physical device as FIG. 12, but programmed to display a picture of a doorbell 1302 which would send the voice via 1206 and video feed 1204 to a location where occupancy has been detected to relay voice and data to that specific location or all locations connected.

Figure 14:
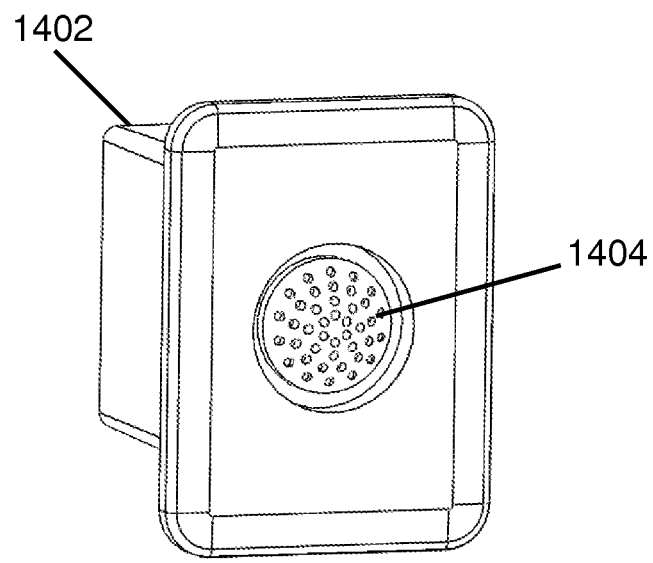
FIG. 14 is an isometric view of another Smart Device Port configured as a voice input device and using a speaker.

FIG. 14 illustrates an exemplary smart device port configured as a speaker device. Visual and audible inputs are important aids in an overall control environment. They can be either a relay of important information or a means of identification of the user. It is expected that a smart port 1402 shown in FIG. 14 may be added if no other types are within the audible range of the user. The device 1402 allows for a small unobtrusive microphone 1404 to be added to a system for just those kinds of purposes. That would enable voice commands to be executed throughout the environment. Many devices have made the attempt to use voice commands in low cost stand-alone systems with limited success. Voice command recognition software and hardware has a direct relationship of quality, sophistication, processing ability, and data storage as it relates to effectiveness. Rather than duplicating the expensive hardware, software, and data storage over and over, it is far more effective to have that centralized and mount remote devices for input. The same type of microphone might be added to any or the smart device ports so that the system is capable of rapidly determining the best method to "hear" in cases of multiple sounds like music in the background or in the case of a video phone call. Because of having a centralized system that knows the data of the speaker outputs, information filtering can remove that data from the microphone inputs. Camera inputs such as the one illustrated in FIG. 10b can also be used to provide retinal and facial recognition for security reasons.

Figure 15:
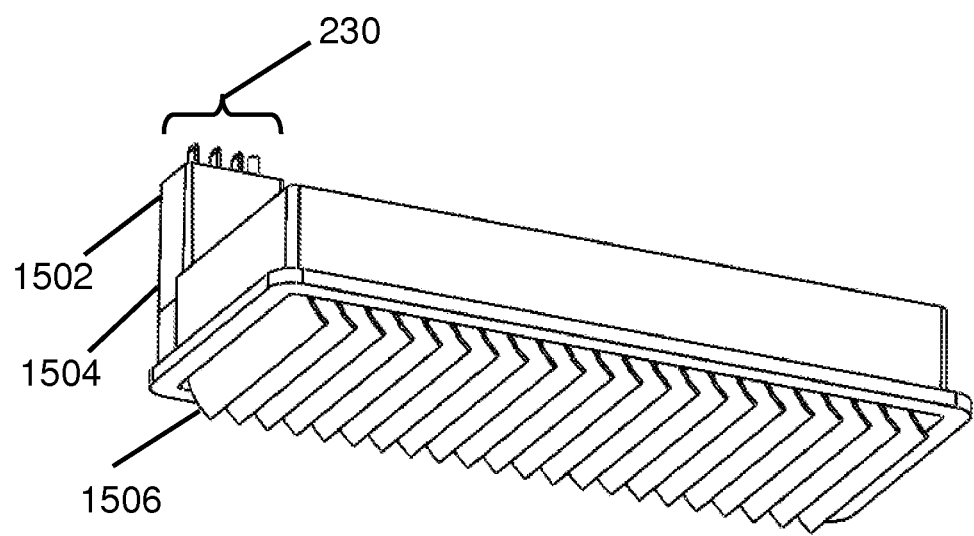
FIG. 15 is an isometric view of an exemplary Smart Device Port configured as motorized vent for a ducted forced air type HVAC system using a standard three plus light connection, a motorized baffle closing system, and an internal temperature monitoring device.

FIG. 15 illustrates and exemplary smart device port configured as a damper control device. Modern HVAC systems have tried to adapt to increased demands placed upon them for energy management, comfort, health, and sustainability. The limitations are many times involved with information gathering and control of the target temperatures. A dwelling with a single sense point cannot satisfy multiple locations that change as a result of the location with respect to the compass, the time of day, and the changes in activity. A central device that understands time of day, activities, distributed temperatures, and outside weather can properly control in a non-wasteful manner provided it can distribute the HVAC output accordingly. FIG. 15 shows a smart device port 1504 capable of being an element of that type of system. It would have the same three wire plus light connectivity 230 as all other devices which when connected to a position sensor 1502 built inside would have the means to fully control the damper 1506 in an appropriate manner It would also comprise an internal temperature monitoring device 1504. It is also expected that duct valves work in a similar arrangement.

Figure 16A:
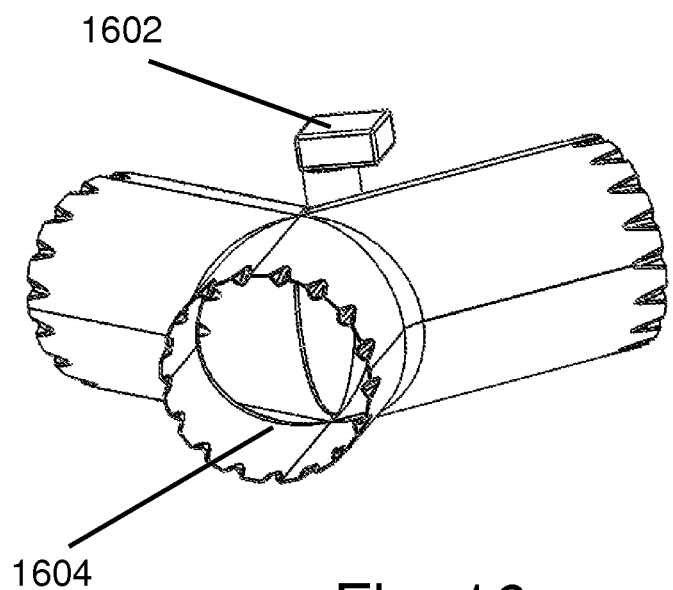
FIG. 16a is an isometric view of a Smart Device Ports and configured as HVAC components for motorized duct work and for hydronic type systems that feature motorized valves for duct work.
Figure 16B:
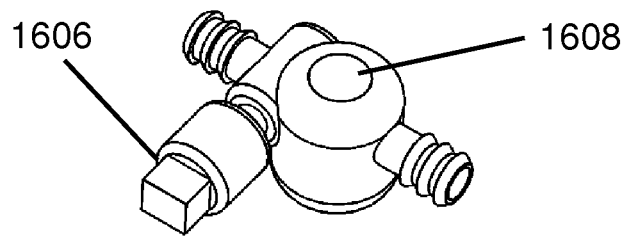
FIG. 16b shows an exemplary view of a smart device port configured as a smart valve for hydronic systems.

FIG. 16a and FIG. 16b show two of many configurable devices that would function with a smart system. FIG. 16a shows an exemplary smart duct. The smart duct 1604 could switch paths or potentially close off air flow using the motorized selector 1602. FIG. 16b shows an exemplary hydronic valve. The system may also perform a similar task by using a hydronic valve 1608 to smart control 1606 in an in-floor heat type system. This would allow fresh air to be added directly to a location based on the time of day from heater ventilator recovery unit based on weather conditions and position of the sun. Likewise, a room may be allowed to vary with weather knowing a predicted change in an unoccupied room will return to control at a later time frame without energy intervention.

Figure 17:
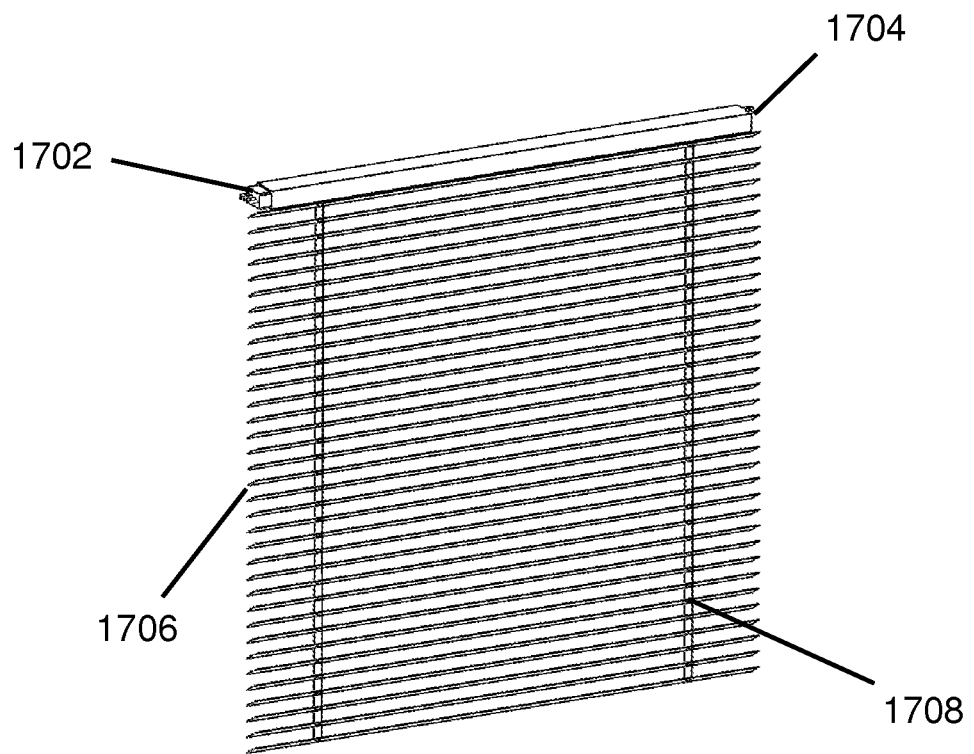
FIG. 17 shows an isometric view of an exemplary Smart Device Port configured as powered window shade or blinds that is powered via a connection port that enables angle changes or retraction.

FIG. 17 illustrates an exemplary motorized shade. Since thermal gain can be both beneficial and detrimental it is useful to have a system of assistance in that area as well. FIG. 17 has just that kind of system. The motorized shade 1702 can power the blinds 1706 using the motor 1704 to close off light gain or to raise blinds 1708 to allow for maximum light penetration. This can also be used to manage light as well.

Figure 18A:
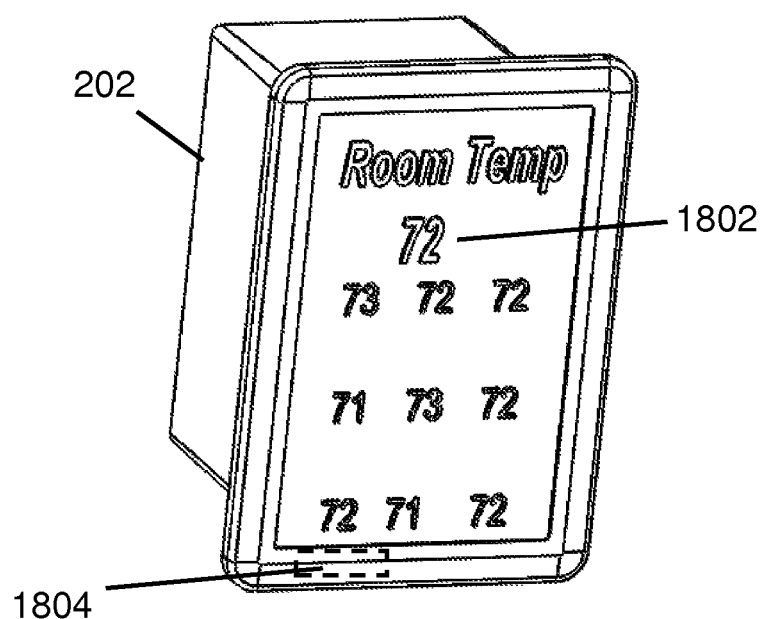
FIG. 18a shows an isometric view of an exemplary Smart Device Port configured as a thermostat that has a room averaging display and screen capture of sense points in the room displaying statuses.

FIG. 18a illustrates an exemplary thermostat. Smarter thermostats have made an attempt to add some of the type of sophistication necessary to achieve the event understanding required to make better decisions based on repetitive tasks or through radio type of internet communications. The present disclosure allows for many more than one type of inputs in the environment and many more points of control. FIG. 18a is an example of the types of devices that might control an environment. The smart device port unit 202 would have a touch screen 1802 that would show the aggregate temperature based on sensors 1804 in the area. This touch screen could also revert back to display switch setting similar to FIG. 6 or any of the other display interactive devices. The temperature sensors can be added to any smart device port inside or outside to add additional information.

Figure 18B:
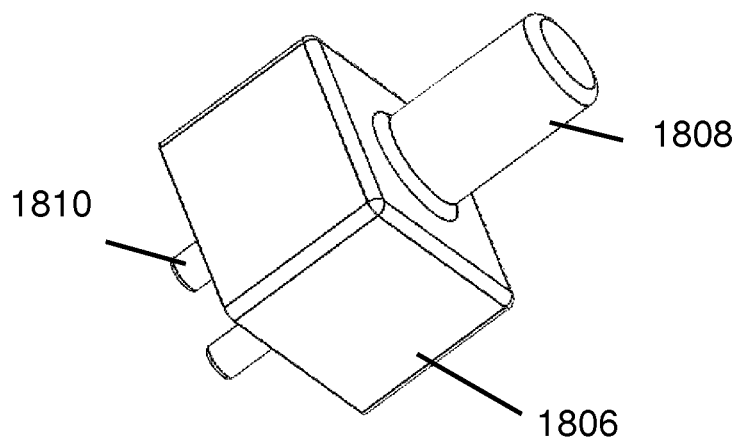
FIG. 18b shows an isometric view of an exemplary miniature plug in temperature sensor and digitizer that senses temperature at the end of the probe and is powered by the plug in power and data pins.

FIG. 18b illustrates an exemplary temperature sensor. A potential version of the present disclosure in one embodiment could be a pluggable device as shown in FIG. 18b into almost any smart control device for added flexibility. This type of device 1806 would be able to provide temperature data optionally via the connection pins 1810 as sensed by the probe 1808 anywhere smart device ports are located.

Figure 19:
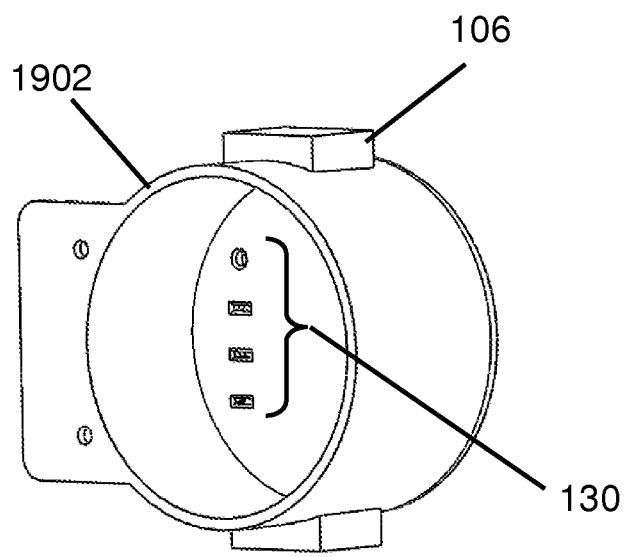
FIG. 19 shows an isometric view of an exemplary version of a termination box 116 configured for uses such as mounting ceiling fans to the three plus light system via smart connection and daisy chain connection.

FIG. 19 illustrates an exemplary ceiling fan interface. Most HVAC systems use some sort of air moving equipment to route altered temperature air to provide heating and cooling. Ironically, many of the rooms that have HVAC control also have an uncoupled ceiling fan that is manually deployed by an occupant. A ceiling fan that is a smart device could mount to a different type—see FIG. 19—of termination box 1902 that has smart connectivity 130 and 106 to be able to participate in the HVAC equation. Occupancy and time of day modifications to the equations could give better, cheaper, and more comfortable control.

Figure 20:
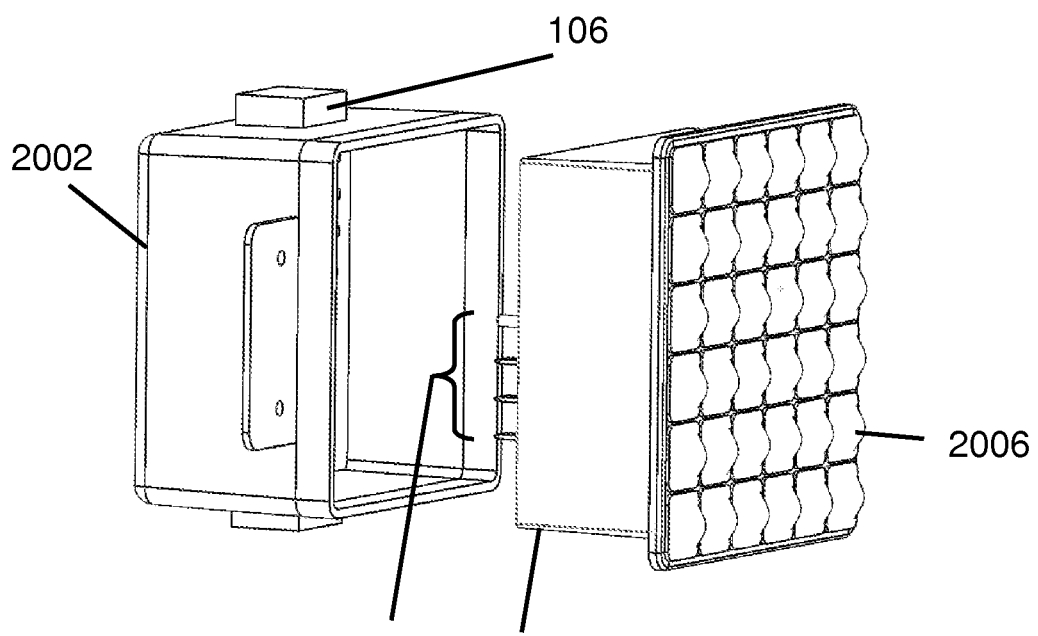
FIG. 20 shows an exploded view of an exemplary termination box and an exemplary smart device port configured as a light fixture installed in the termination box. The termination box has a three plus light connection, and that enables plug in features to perform tasks like light sense, temperature measurement, and smoke detection while also providing light at a variable and appropriate rate for the time of day and light conditions.

FIG. 20 shows an exploded view of an exemplary termination box and an exemplary smart device port configured as a light fixture installed in the termination box. The termination box has a three plus light connection, and that enables plug in features to perform tasks like light sense, temperature measurement, and smoke detection while also providing light at a variable and appropriate rate for the time of day and light conditions.

Lighting is a fundamental element in modern systems where people are involved. Major strides have been made in terms of better components to generate light. Sadly, they are straddled to the past in terms of application. LED devices use a small amount of power and are ideal for creating light in very specific bandwidths. They are applied to mounting methods created over one hundred years ago. Their life expectancy is so long to burden them with archaic methods of mounting is puzzling and can be quite ineffective. Heat transfer is a major factor in life expectancy and cannot be made effective with a screw in "Edison type" glass light bulb socket. A wider and broader type of connection can be more ideal such as depicted in FIG. 20 where the termination box 2002 can accommodate a three wire plus light connection 106 and 230 for smart device port configured as an LED fixture 2010. The device could have several banks of LED's 2006 driven by a controller that may house ambient light sensors, microphones, occupancy sensors, and a smoke detector. In one embodiment, the most energy efficient light wouldn't be turned on when no one is the room or if the light in the room is already at desired levels from daylight. Larger banks of different spectrum LED's can provide better quality of light more tailored to need and time of day.

Figure 21:
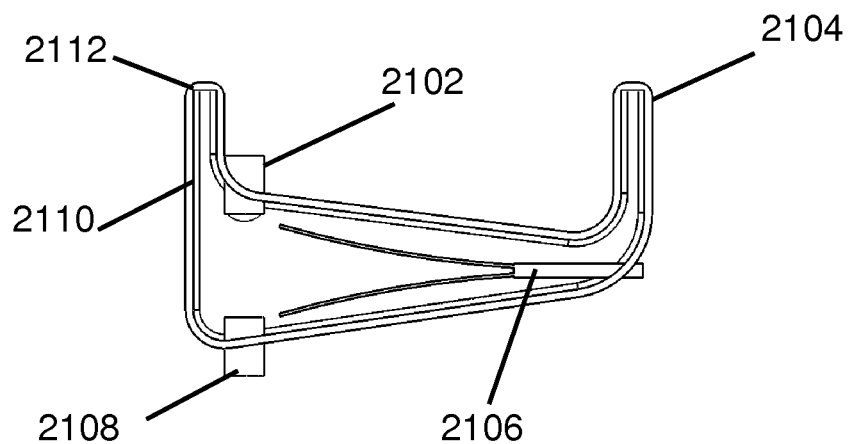
FIG. 21 is a section view of a plug in smoke detector whose inlet powers air through the device via a miniature piezoelectric fan past a source light and a light detector and eventually exhausts through the outlet.
Figure 23:
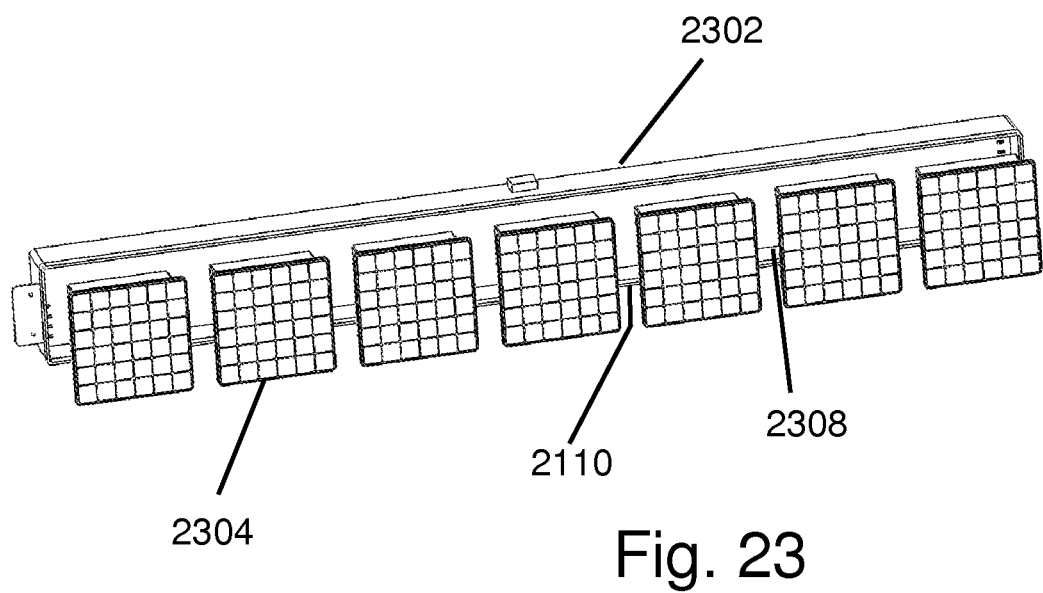
FIG. 23 is an isometric view of a Smart Device Port configured as fluorescent light fixture that has banks of lights and options for smoke detector and ambient light sense.

FIG. 21 illustrates an exemplary smoke detector. It is expected that smoke detectors could be added to ceiling light combinations such as shown in FIG. 23. The smoke detector device 2110 is quite small and would sample air at the ceiling level by powering air in an input port 2104 via use of a fan 2106 past a typical emitter 2108 and detector 2102 pair before exhausting through the output port 2112. Several devices in the room could provide better detection by eliminating false triggers such as steam or cooking smoke that may be normal and allowable occurrences. A total system has a lot of advantages if it knows the temperature of the room, the status of the cooking devices and more than one smoke sense point.

Figure 22:
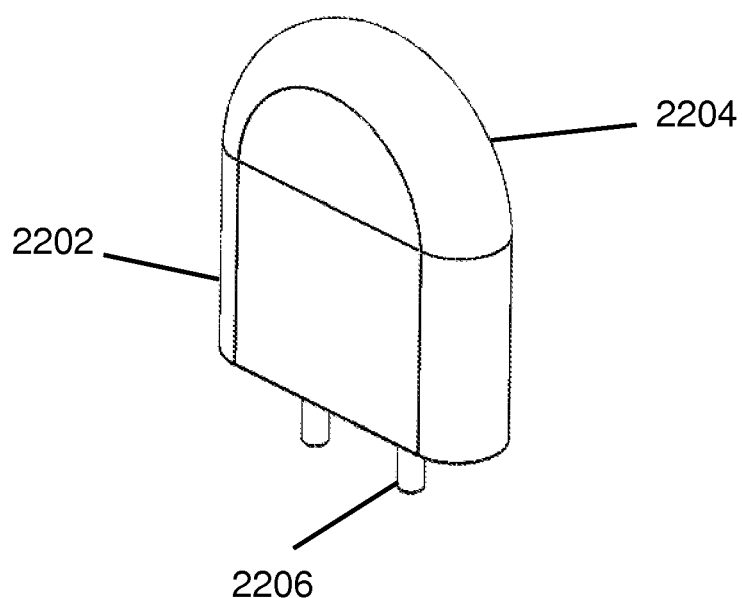
FIG. 22 is an isometric view of an occupancy sensor and digitizer that senses people in the room and is powered by the plug in power and data pins.

FIG. 22 illustrates an exemplary motion detector. An occupancy detector 2202 FIG. 22 that determines motion in the room via a passive infrared sensor 2204 can transmit signals 2206 directly into the light smart device port to the status of people in the room. Other occupancy sensors throughout the environment can do a self-learning process to better understand the needs ahead of time.

FIG. 23 illustrates an exemplary light fixture with smoke detector. Light can be configured in many different shapes and sizes and may be used for commercial applications where partial applications of a total system may be deployed. FIG. 23 is such a device that has that potential. The fixture 2302 may have banks of LED lights 2304 as well as smoke detection device 2110 and ambient light detection device 2308 within the configured unit.

Figure 24:
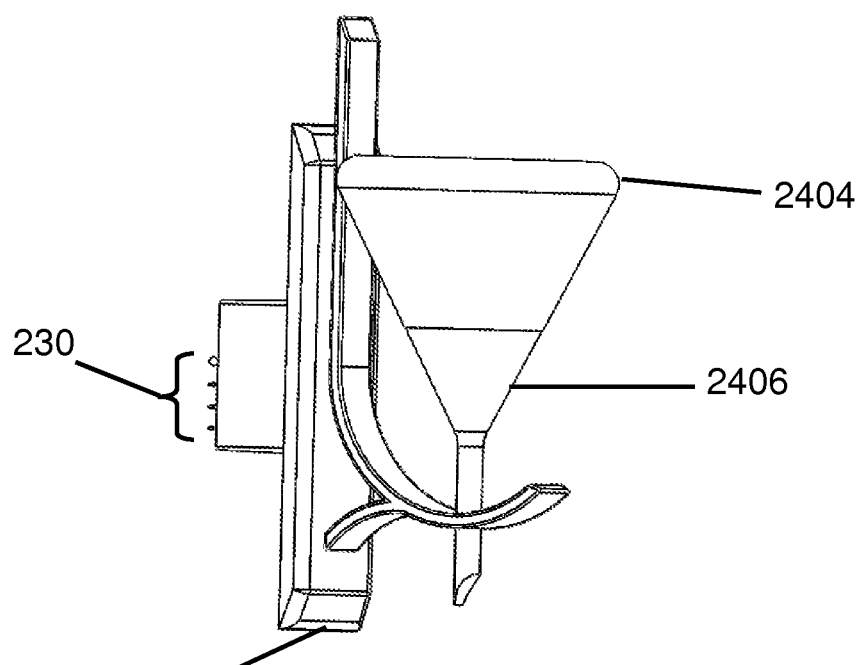
FIG. 24 is an isometric view of a Smart Device Port configured as a sconce light fixture that can be easily replaced by plugging and fastening one screw to make the three plug light connection and options for ambient light sense detector and light.

FIG. 24 illustrates an exemplary sconce lighting fixture Lights may also be used as a decorative element such as the one shown in FIG. 23 where the sconce light 2408 is plugged into a termination box via smart device port connections 230 to illuminate the room via LED lights 2404 and pluggable sensors 2406. This type of sconce light could be easily changed seasonally if desired.

Figure 25:
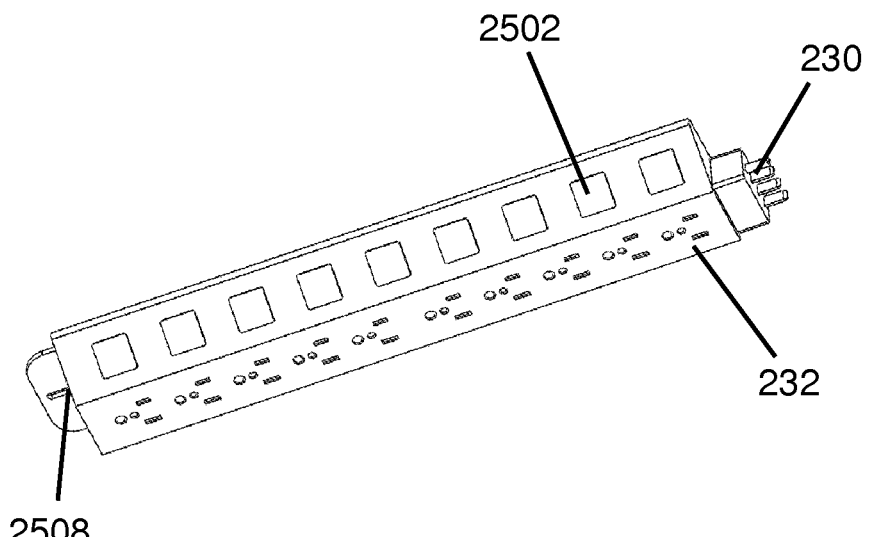
FIG. 25 is an isometric view of a Smart Device Port configured as an under cabinet light and plug strip that has a bank of lights and smart outlets that is plugged into a small termination box with a smart connection.

FIG. 25 illustrates an exemplary light fixture with outlets. Other specialty areas of lighting are expected such as shown in FIG. 25 where the light fixture 2508 is has a bank of lights 2502 and a smart plug strip 232 that plugs directly into a termination box for the smart connection via 230. Any smart device anywhere may have added lights for nighttime or task specific uses. The combination of occupancy detection and late night times could result in a very low light walking night light of pleasing colors that does not force unwanted eye dilation. During specific times of the day, motorized blinds (FIG. 17) may work interactively to supply light while blocking heat gain and cause light fixtures to adapt and back fill illumination to the time based standard desired.

Figure 26:
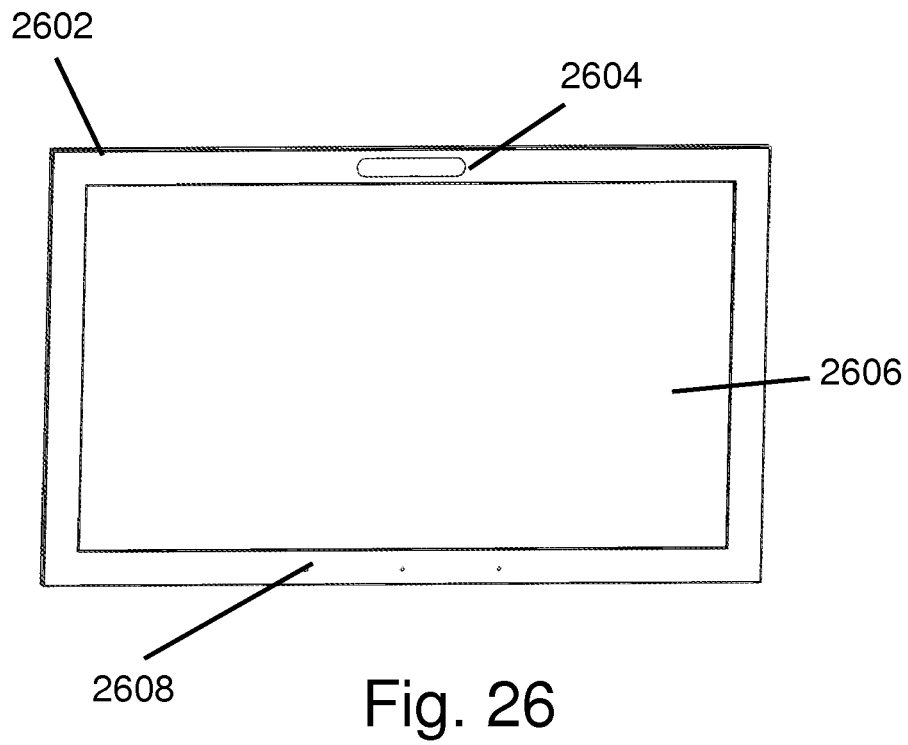
FIG. 26 is a communication portal that plugs into a smart device port that enables video input via camera and a video feed onto the screen along with microphone input to enable video chat.

FIG. 26 illustrates an exemplary media display. The lack of control and communication between ordinary devices in an ever increasing media rich environment causes several unwanted results from competing devices. The phone ringing, doorbell ringing, timer buzzers, clock chiming, smoke detector, and computer receiving mail all compete in a disorderly manner to operate when prompted by whatever interrupt is hard-wired into its path. Sometimes, a bevy of inputs can be shared with other forms of alerts such as flashing lights, line items on a display, or simple suspend take turns approaches. Media control is highly desired item but there are only clumsy radio controlled methods by which the problem is even attempted and most are confined to the interior of an automobile. In the smart device port world plugging a simple monitor into an outlet such as FIG. 26 becomes a communication port 2602 capable of video conferencing with its camera 2604 and microphone 2608. The display 2606 could be segmented for e-mail, a visual of the front door and provide a display of the oven temperatures in the kitchen. All of this can be acquired in a simpler fashion using the technology of the present disclosure.

Figure 27:
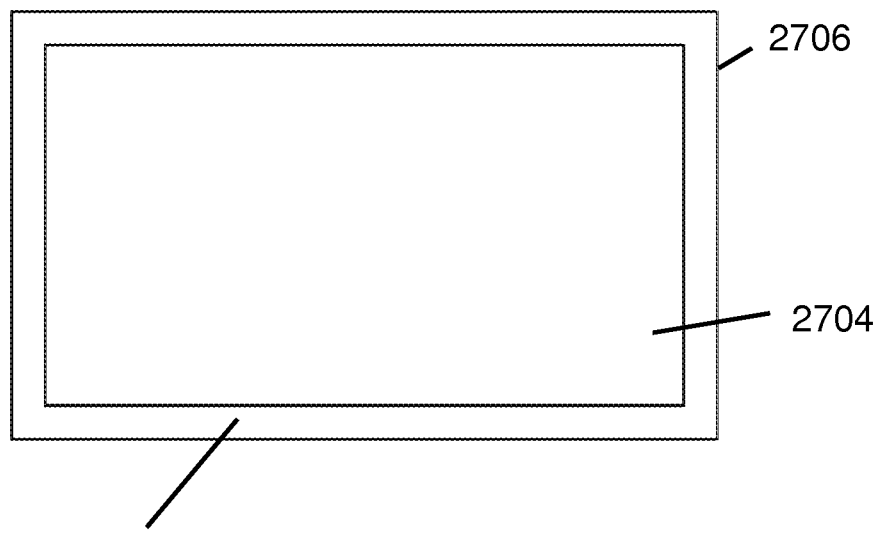
FIG. 27 is an isometric view of a Smart Device Port configured as a changeable video art frame that has a display and communicates via the three plus light connection.

FIG. 27 illustrates an exemplary picture display. The same device also doubles as monitor for a computer if so desired. In fact it would be expected to use monitors in several places such as FIG. 27 which is a monitor 2702 capable of displaying pictures in a sequential fashion on its display 2704 and could switch to be an added TV screen without sound for the other game happening at the same time. The connection 2706 can allow any type of output desired and can even allow a change from a sconce light to a monitor and back.

Figures 28A, 28B:
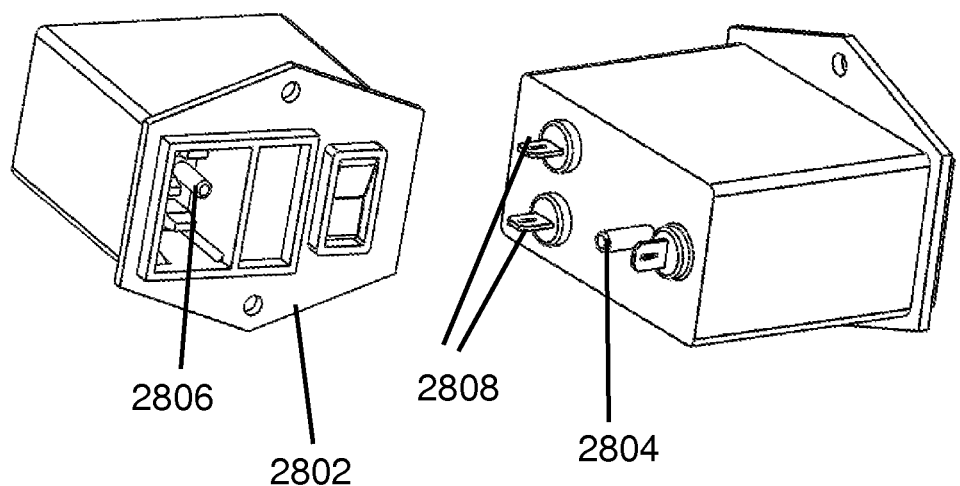
FIG. 28a and FIG. 28b illustrate twoisometric views of an exemplary EMC/EMI Filter Input device showing an added optical input and an optical output.

FIG. 28a and FIG. 28b illustrate two isometric views of an exemplary filtered connector including three wire plus light connections. Powered devices such as monitors and various electronic devices have input power connections made through an EMI/EMC filter similar to the one depicted in FIG. 28a. The filtered connector has a number of operating features that benefit electronic equipment including the built in filter and flexibility of allowing world wide plug-in capability by selecting various power cords for each desired country. The filtered connector 2802 includes power connections 2808 as well as optical fiber network connections 2804 and 2806.

Figure 29:
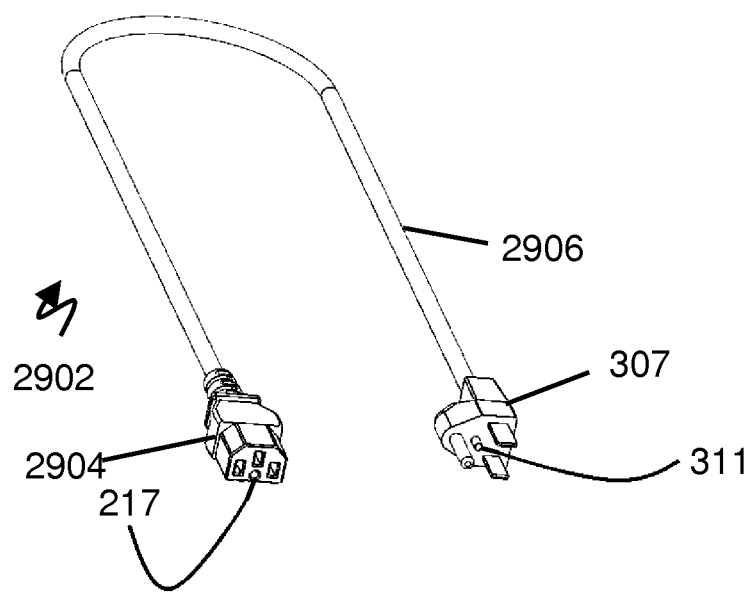
FIG. 29 is an isometric view of an exemplary power cord that allows for power and data to be transmitted from a Smart Device Port and 3 plus light port for connection to a 3 plus light appliance capable of communication.

FIG. 29 is an isometric view of an exemplary power cord 2902 that allows for power and data to be transmitted from a Smart Device Port and 3 plus light port to a 3 plus light appliance. Exemplary cable 2902 comprises a cord 2906 with three conductors and one or more optical fibers connected with a connector 307 for wall connections and 2904 for equipment connections. Connector 2904 may be similar to IEC 60320-C13 with the addition of at least one optical fiber connection 217 added near the center of the electrical pin configuration. The IEC 60320 standard defines several connectors that may be modified by adding an optical connection near the center of the electrical connections. This combined power and optical data connection can eliminate many of the additional cables typically used to pass information.

Figure 30:
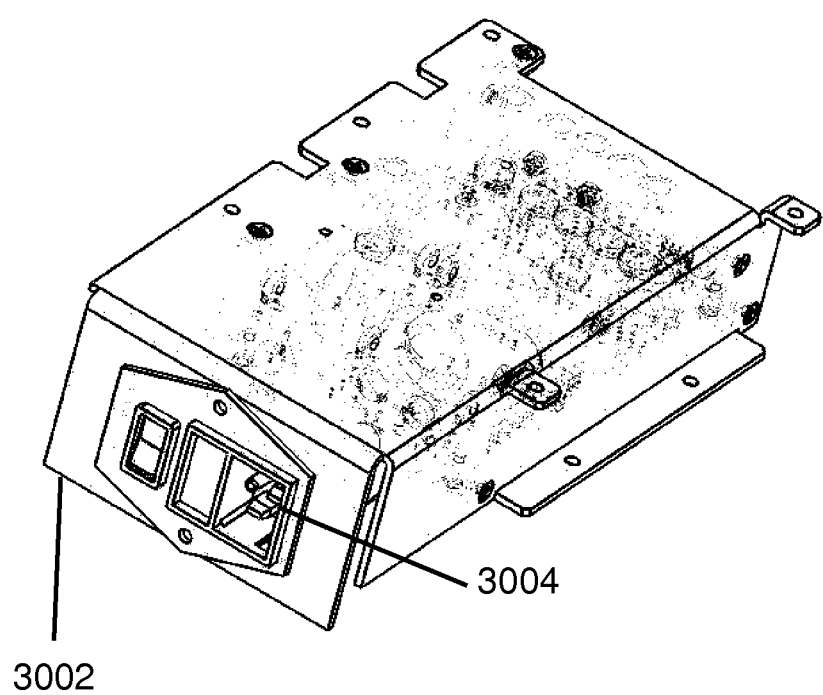
FIG. 30 is an isometric view of a power supply showing an added optical input.

FIG. 30 illustrates an exemplary smart power supply. It is expected that devices FIG. 30 that use input power supplies 3002 to also include a data pass 3004 through to the device. For instance, a computer plugged into a smart plug can communicate to a printer in another room plugged into smart plug without any other form of communication. As shown, the connector may be a modified IEC 60320—C14 connector with one or more fiber data connections added to receive the C13 connector from the cable of FIG. 29. Alternatively, other IEC 60320 sockets may be modified and used.

Figure 31:
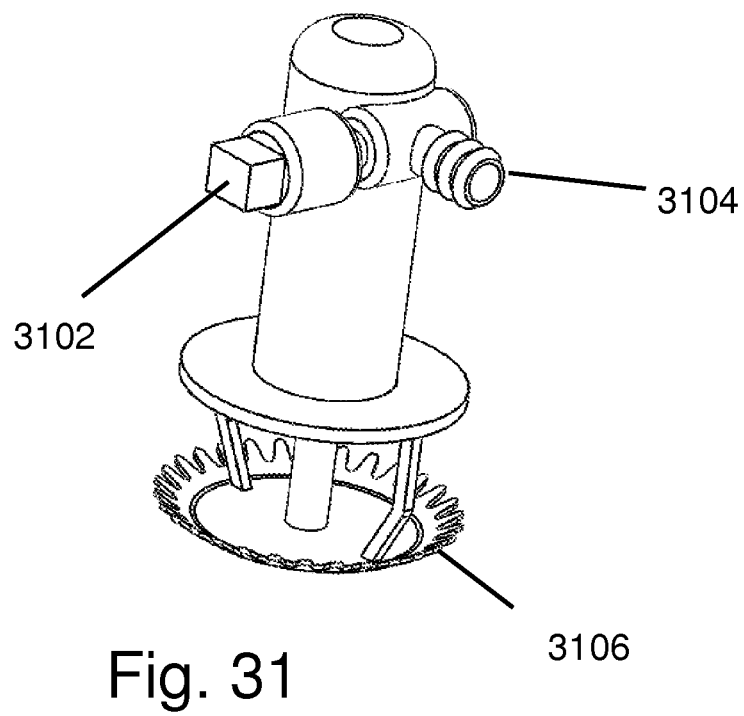
FIG. 31 is an isometric view of a Smart Device Port configured as fire prevention sprinkler head that features a water connection and connection port.

FIG. 31 illustrates an exemplary sprinkler head. Water control is a desire for many applications. This can take a great number of forms and can benefit from a smart device port perspective of the present disclosure. For instance, many homes and commercial buildings have fire prevention systems that are activated by a thermally destroyed device that allows the free flow of water. A better method is shown in FIG. 31 where the sprinkler head 3106 is deployed using a motor driven valve 3102 via smart connectivity to valve the incoming water 3104. The system would use a great many inputs such as temperature, smoke, and light detection to determine when to turn on the system and when it is permissible to stop. Stopping the sprinkler will save a lot of resources.

Figure 32:
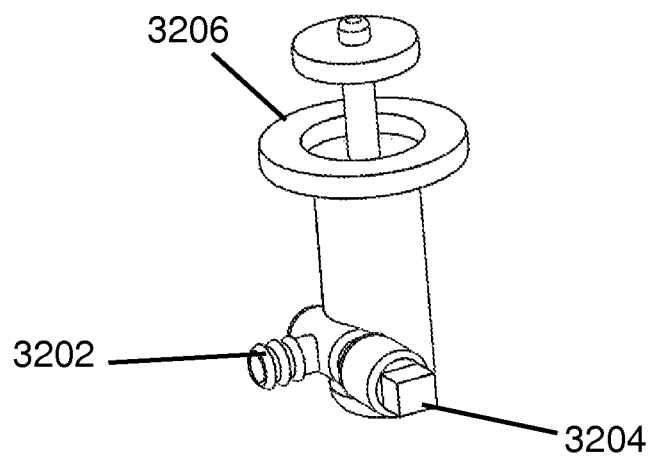
FIG. 32 is an isometric view of a Smart Device Port configured as a sprinkler head for irrigation that features a water connection and a connection port.

FIG. 32 illustrates an exemplary interface for an irrigation system. Other types of systems involve irrigation systems like the one shown in FIG. 32. The device could be controlled at the head itself 3206 to allow smart connectivity 3204 to valve the incoming water 3202 to be controlled at the device.

Figure 33:
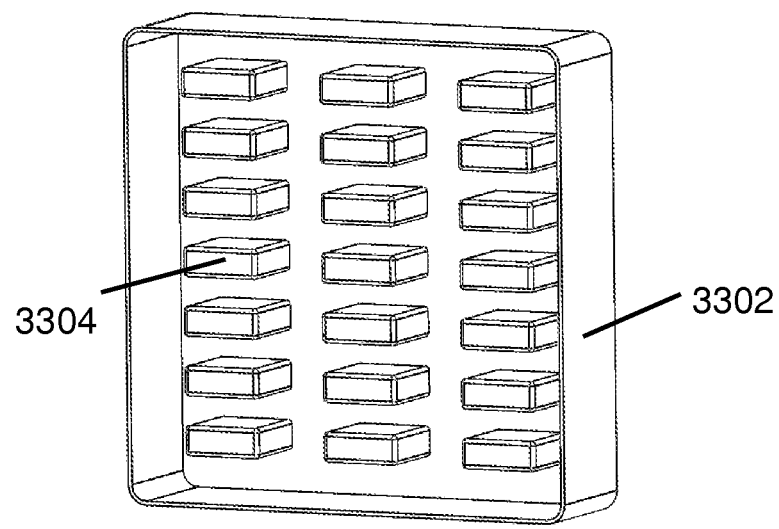
FIG. 33 is an isometric view of a smart device port configured as a sprinkler system which has individual modules for individual sprinkler control.

FIG. 33 illustrates an exemplary sprinkler controller. Conversely, a sprinkler control system FIG. 33 could be given instructions via smart connectivity 3302 to control a number of individual switches 3304 to turn on and off the various valves.

Figure 34:
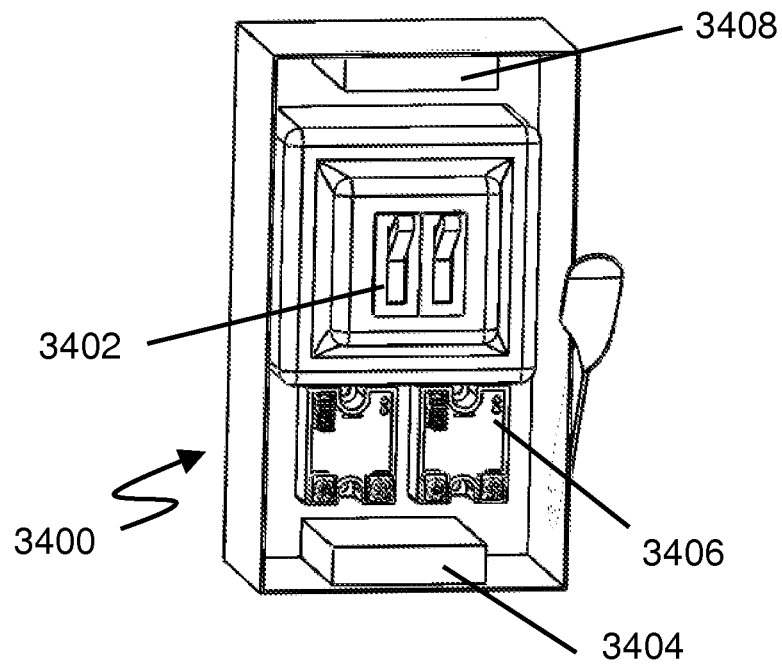
FIG. 34 shows an isometric view of a high power smart device port with standard manual disconnects for power disengagement along with remote power disconnects for computer control and three plus pass through for additional information and power.

FIG. 34 illustrates an exemplary breaker switch and high power smart device port 3400. Higher power devices can also benefit from control that is intelligent. A unit that is depicted in FIG. 34 with its secondary switches 3402 for manual control can also be switched with large electronic switches 3406 for programmable control which would enable the input 3404 to be disconnected from 3408. This could be used to control power to an HVAC compressor, hot water heater, oven, or blower in a HVAC system. Any large user of power may be desired to be controlled for the express use of reducing energy rates (peak rate avoidance). Also, reducing load is sometimes necessary when auxiliary generation is used to not over tax a generator.

Figure 35:
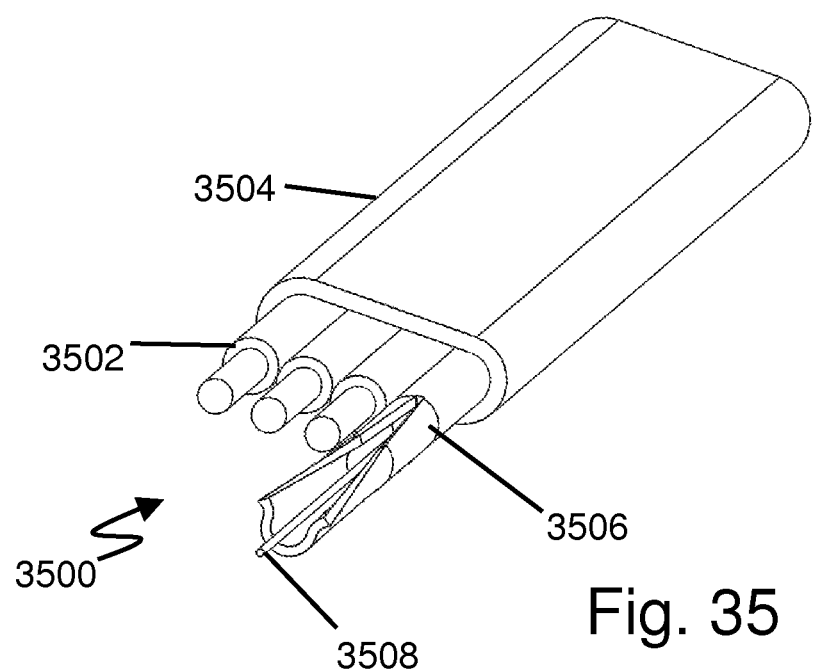
FIG. 35 shows an isometric view of a three plus light wire bundle which has three wires for electricity and fiber optic conductor in a protective sheath.

FIG. 35 illustrates an exemplary combined electrical and fiber cable. Three Plus Light Wire 3500 comprises three electrical conductors 3502 (hot, neutral, and ground) sheathed in a carrier 3504 along with a secondary sheathing 3506. One of the secondary sheatings houses one or more optical fibers 3508 for data transmission. The gauge of wire is dependent on the application current. Also, the number of conductors may increase for higher voltage applications for both single and three phase power. The fiber optic may be either plastic (POF) or glass depending on the data speed desired. Several sheathed optical fibers may be housed as well for higher transmission requirements. One purpose of this Three Plus Light Wire is to carry all inputs back to a centralized hub capable of controlling all devices connected to it. Once installed, it is expected to remain in place with inert passive connections at both ends. The dialogue ensues when devices at both ends are installed.

Figure 36:
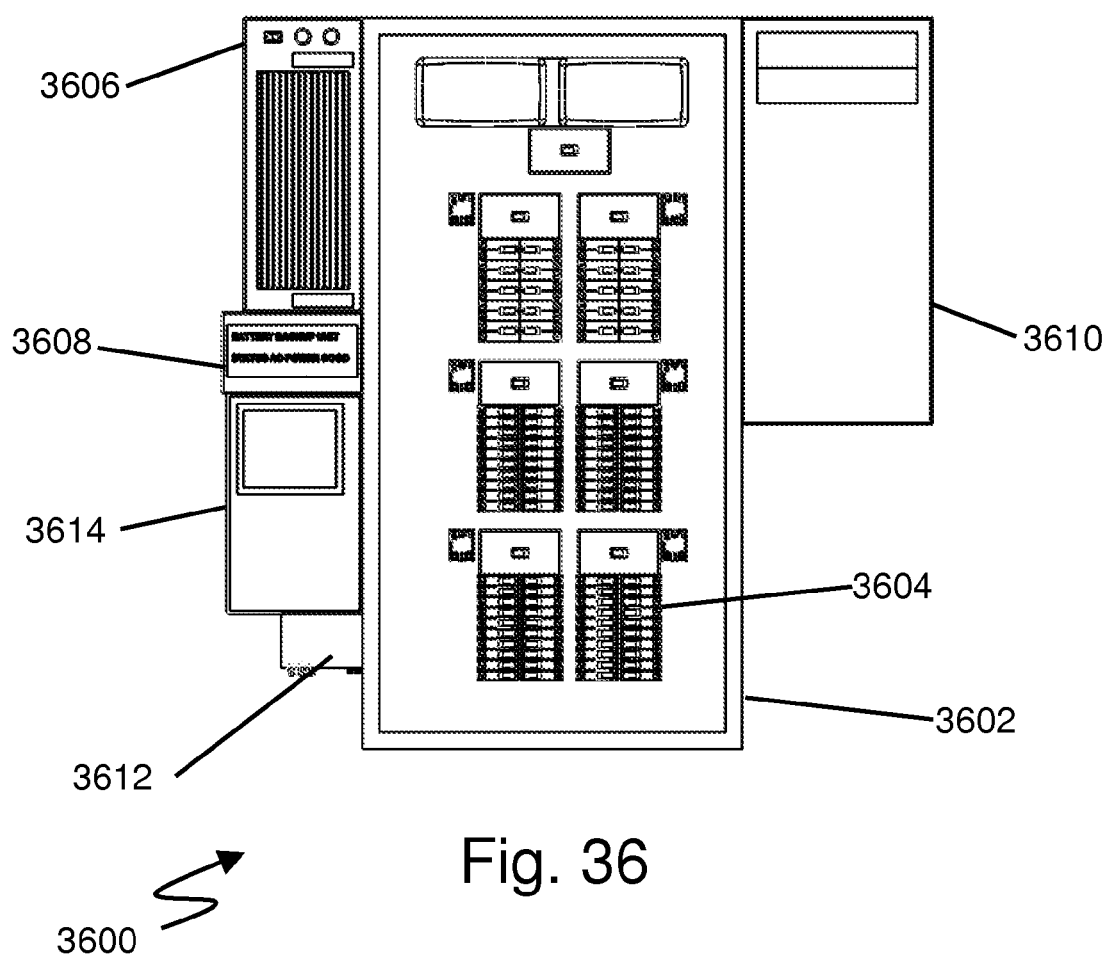
FIG. 36 shows a front view of an origination of the Three Plus Light System showing the primary power distribution panel that houses the circuit breakers in an organized fashion as the source of power and data.

FIG. 36 is front view of an origination of the Three Plus Light System 3600 showing the primary power distribution panel 3602 that houses the circuit breakers 3604 in an organized fashion as the source of power and data. Power connections are shown with a DC power converter device 3606, a battery controller 3608, and a generator switch 3610. Data inputs are configured for ports 3612, which is the media control center. Finally, the system comprises a central processing unit 3614 configured for controlling the three plus light and power system.

FIG. 36 depicts a configured origination system for the enabling of the control and communication of previously described embodiments. The entire system shown does not require wiring to upgrade and update. The circuit breakers 3604 are unconventional and plug at both ends of the switch. The circuit breaker cabinet 3602 is installed and permanently wired unless extraordinary changes are desired. The central computer and data storage unit 3614 can be plugged in vertically and changed in its entirety. The media connection center 3612 is also pluggable and can be upgraded from time to time. The optional battery backup unit 3608 can deal with short term outages and provide command control during power disruptions. During these interruptions, or as a part of an energy alternative regime, there are alternative energy sources from a solar type system or any other DC source with the inverter 3606 and or alternatively the generator switch 3610.

Figure 37:
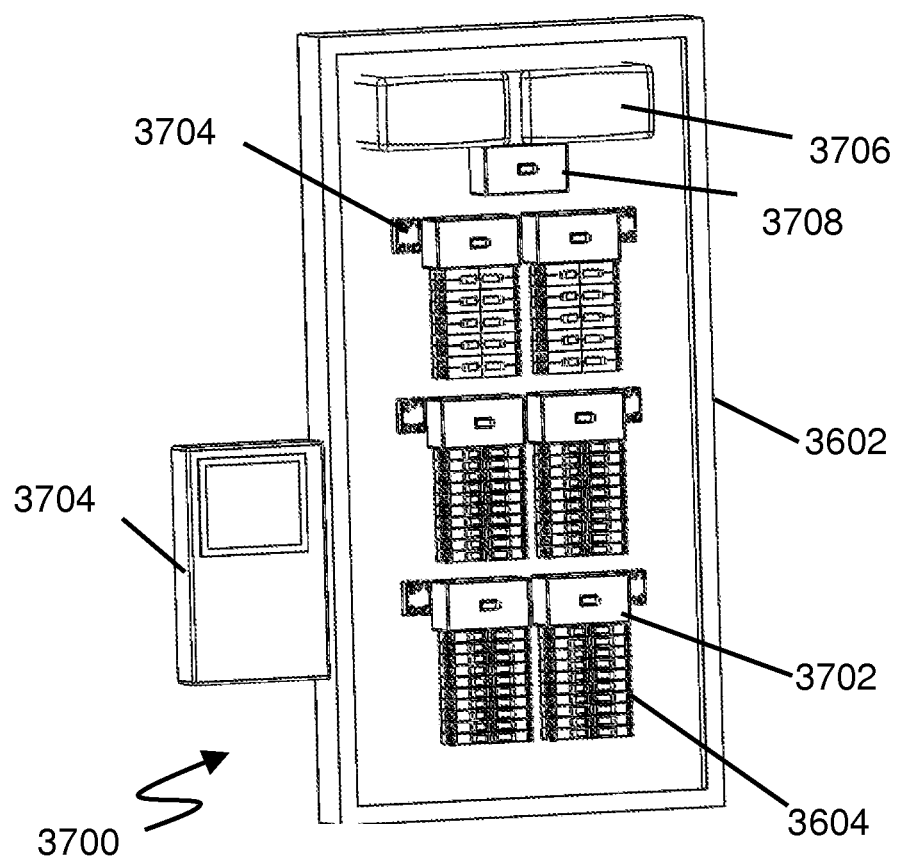
FIG. 37 shows an anatomy of an exemplary command and control system comprising a power distribution panel where individual circuit breakers and controlled by master switch for manual control and the electronic switch for controlled phased energy deployment for peak energy usage management purposes.

FIG. 37 shows an anatomy of an exemplary command and control system 3700 comprising a power distribution panel 3602 where individual circuit breakers 3604 and controlled by master switch 3702 for manual control and the electronic switch 3704 for controlled phased energy deployment for peak energy usage management purposes. Each bank of circuit breakers may be either alternating current or direct current depending on needs. It is conceivable that a whole alternating current direct current power supply may be wired for support when solar gains do not meet internal needs. Finally, the unit has a total supply surge suppressor 3706 and a master disconnect switch 3708 for breaking all incoming power.

Figure 38:
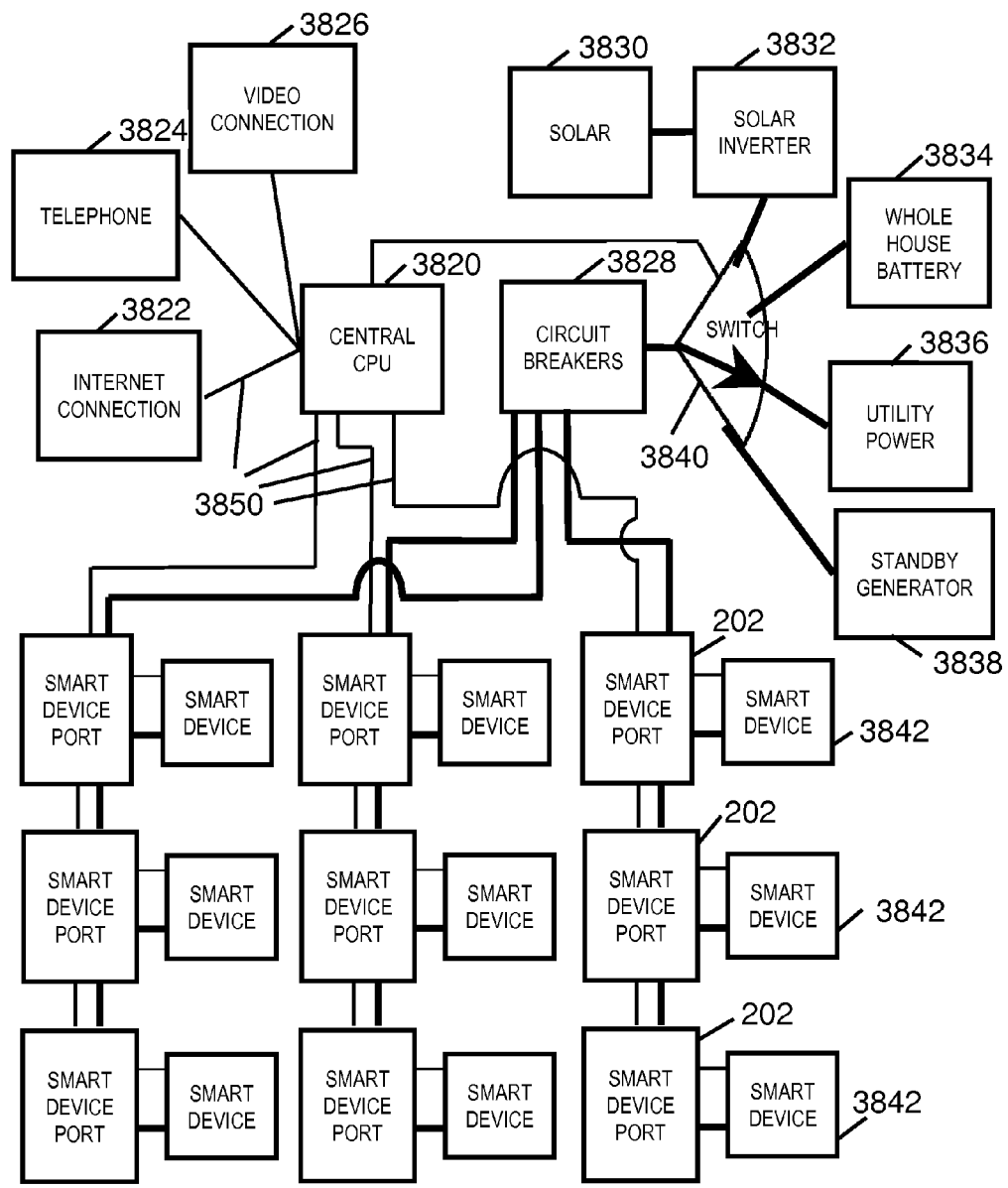
FIG. 38 illustrates an exemplary schematic of a resource control system.

FIG. 38 illustrates an exemplary schematic of a resource control system. Referring to FIG. 38, a central CPU 3820 is connected with and controls or may receive control from a number of connected systems including, but not limited to an internet connection 3822, telephone connection 3824, and video connection 3826. The system may read and control circuit breakers 3828 and may read and control power from a number of sources by a control switch 3840, including solar power from a solar array 3830 and an inverter 3832, whole house battery 3834, utility 3836, and standby generator 3838. The circuit breakers may feed a number of branch circuits providing power and fiber optic data to each smart outlet 202, which may then supply a smart device 3842. The entire system may be interconnected by a fiber optic network 3850.

Figure 39:
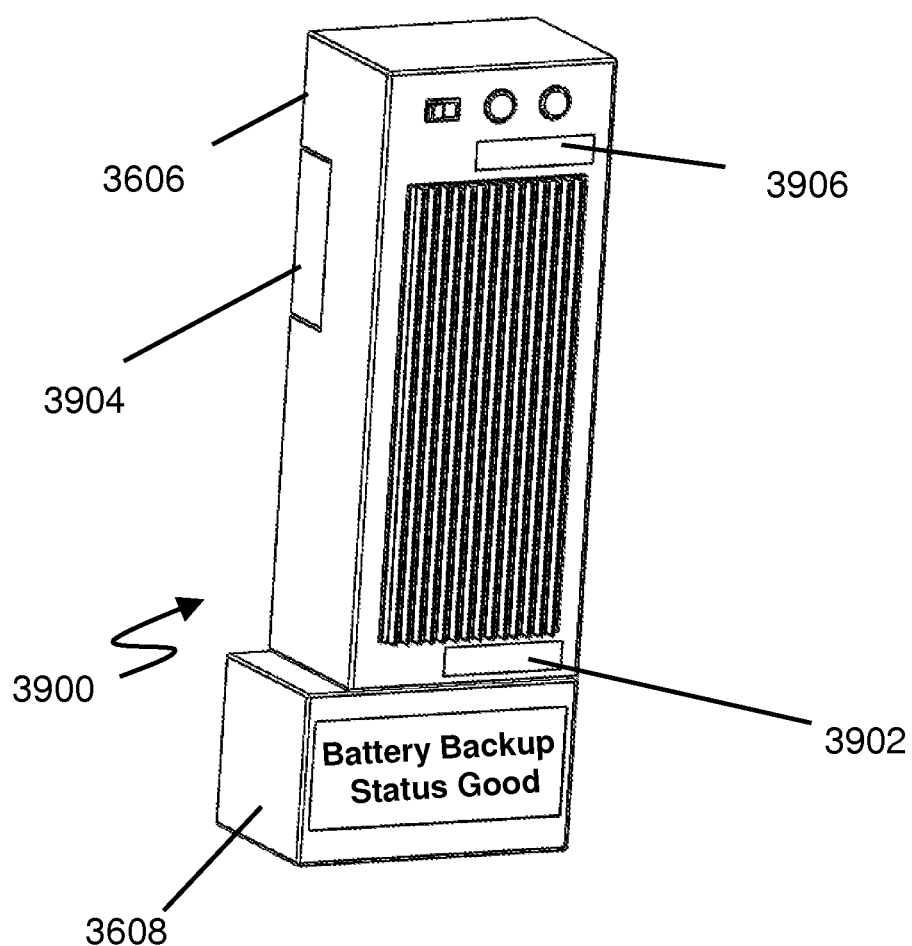
FIG. 39 shows an isometric view of the origination point of the integrated DC inverter and battery controller that has integrated control to the main power system, the battery switchover controller and the inverter connection to solar grids.

FIG. 39 illustrates an exemplary direct current controller. FIG. 39 shows the direct current controller 3900 comprising tandem pair of the battery backup unit 3608 and the direct current inverter 3606. Since battery backup needs inversion from DC to AC it is expected that the two devices will typically be in tandem. The inverter also has a battery switchover controller 3902 that manages when battery banks are brought online by use of the inverter connection 3904 and eventually into the power distribution connection 3906.

Figure 40:
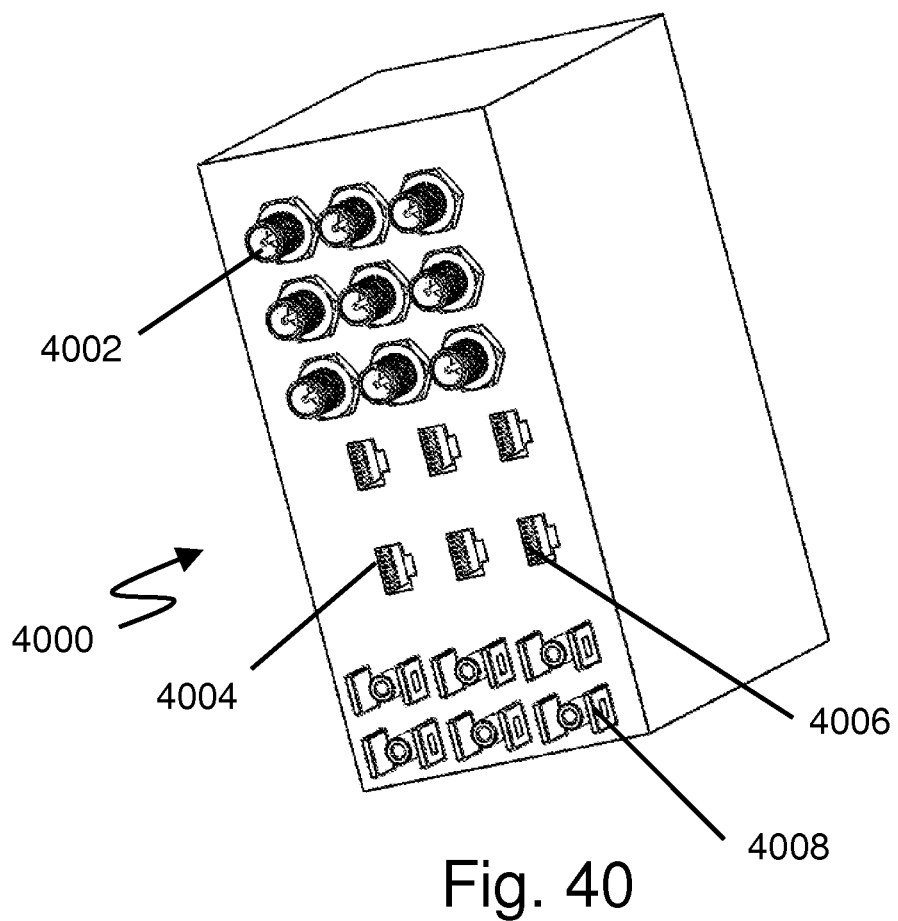
FIG. 40 shows an isometric view of the origination point of the media control unit that allows various video sources, various telephony connections, various data sources, and other sources of future connectivity such as fiber optic inputs to be connected.

FIG. 40 is an isometric view of an exemplary origination point of the media control unit 4000 that allows various video sources 4002, various telephony connections 4004, various data sources 4006, and other sources of future connectivity such as fiber optic inputs 4008 to be connected.

Figure 41:
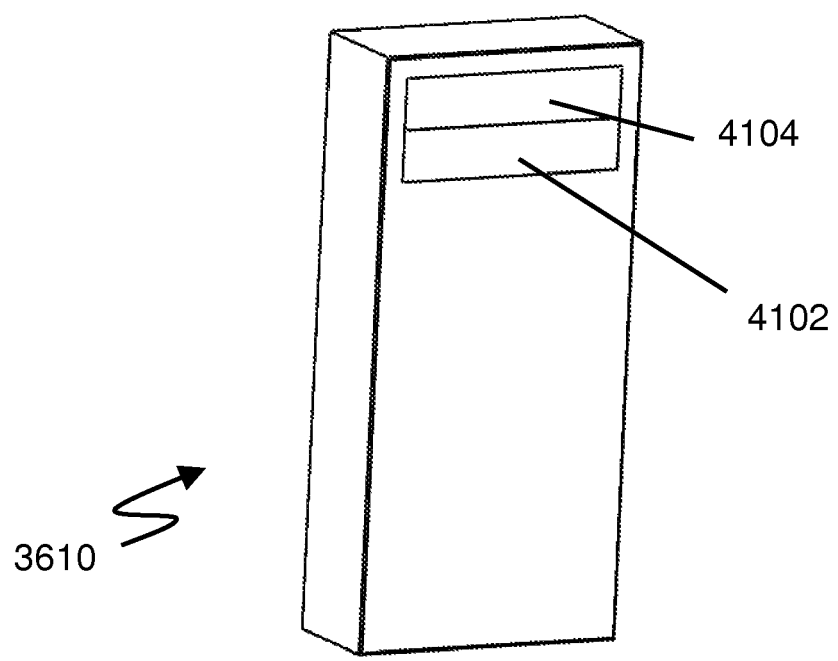
FIG. 41 is an isometric view of back-up generator switch designed to connect with the system when it is determined to be needed with the power monitor and provide system power via the smart connection.

FIG. 41 is an isometric view of an exemplary back-up generator switch 3610 designed to connect with the system when it is determined to be needed with the power monitor 4102 and provide system power via the smart connection 4104.

In short, the system of the present disclosure provides all connections and computational power required to combine, manage, collate, and calculate programmable selections by one or more users for all electrical, thermal, light, and water resources connected to it.

CONCLUSION

One should understand that numerous variations may be made by one skilled in the art based on the teachings herein. Such variations include but are not limited to variations in color scheme, label text, placement and size of controls, and number of controls. The exact function of controls may be varied within a class of similar functions.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for optical data and electrical power connection in a single equipment connector, said system comprising:
 a first connection box comprising:
  means for permanent connection to building power and building optical fiber network, said optical fiber network configured for receiving and delivering information including all of the following: Internet content, video information, and building automation signaling; and
  a pluggable socket connector connected to said means for permanent connection to building power, said pluggable socket connector for delivering said building power and optical fiber network;
 a smart device port comprising:
  a pluggable pin connection adapted for connecting to said pluggable socket connection of said connection box, said pluggable pin connection including connection for said power, neutral, and ground electrical power and connection for said optical fiber network, and
  at least one equipment socket connected to said pluggable pin connection and providing:
   three electrical equipment socket connections for said power, neutral and ground; and
   at least one equipment optical fiber socket connection connected to said connection for optical fiber through a smart device fiber link for delivering optical fiber network signals, said at least one equipment optical fiber socket spaced from each of the three electrical socket connections and configured to interface with a plug having power, neutral and ground pins and a plug optical pin disposed in a region laterally between plug power and neutral pins and below the ground pin, with a face of the plug oriented with the ground pin;

said system further including a controllable breaker and switch panel for feeding said building electrical power, said breaker and switch panel controlled by a control computer connected to said building fiber optic network, said system further connected to an alternate power source through said breaker and switch panel, wherein said control computer is capable of switching said building electrical power to said alternate power source using said fiber optic network; and said control computer is capable of controlling one or more branch circuit loads using said fiber optic network in accordance with a control program running on said control computer;

said system further including an occupancy sensor connected to said control computer over said building optical network said optical sensor sensing occupancy in a first room, and an entertainment device plugged into said equipment socket in a second room adjacent to said first room, said entertainment device receiving connection to said building optical network through said equipment socket, said entertainment device connected to said control computer over said building optical network, wherein said control computer is configured to control said entertainment device in accordance with detection of occupancy in said first room and further based on a user preference entered into said control computer through said building fiber optic network.

* * * * *